US011346379B2

(12) United States Patent
Hida

(10) Patent No.: US 11,346,379 B2
(45) Date of Patent: May 31, 2022

(54) ARTICLE-FIXING DEVICE

(71) Applicant: HONDA MOTOR CO., LTD., Tokyo (JP)

(72) Inventor: Kazunori Hida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 251 days.

(21) Appl. No.: 16/701,200

(22) Filed: Dec. 3, 2019

(65) Prior Publication Data
US 2020/0191183 A1 Jun. 18, 2020

(30) Foreign Application Priority Data
Dec. 12, 2018 (JP) .............................. JP2018-232914

(51) Int. Cl.
*B62D 25/06* (2006.01)
*B62D 27/06* (2006.01)
*B60R 9/04* (2006.01)
*F16B 5/02* (2006.01)

(52) U.S. Cl.
CPC .............. *F16B 5/0216* (2013.01); *B60R 9/04* (2013.01); *B62D 25/06* (2013.01); *B62D 27/065* (2013.01)

(58) Field of Classification Search
CPC ...... B62D 25/02; B62D 25/025; B62D 25/06; B62D 27/06; B62D 27/065; F16B 5/0216; F16B 5/0223; F16B 5/2016; F16B 5/2033; F16B 5/0275; B60R 9/04; B60R 9/058
See application file for complete search history.

(56) References Cited

U.S. PATENT DOCUMENTS

| | | | | |
|---|---|---|---|---|
| 6,409,258 B1 * | 6/2002 | Grimm | ............... | B60J 7/022 |
| | | | | 296/210 |
| 6,592,177 B1 * | 7/2003 | Mathew | .............. | B62D 25/06 |
| | | | | 296/102 |
| 9,187,045 B2 | 11/2015 | Bittner | | |
| 2007/0273179 A1 * | 11/2007 | Hommel | .............. | B62D 27/065 |
| | | | | 296/204 |
| 2009/0020573 A1 * | 1/2009 | Binder | ..................... | B60R 9/04 |
| | | | | 224/326 |
| 2012/0003034 A1 * | 1/2012 | Inaba | .................... | F16B 5/0657 |
| | | | | 403/220 |
| 2013/0299539 A1 * | 11/2013 | Bocker | .................... | B60R 9/00 |
| | | | | 224/309 |

(Continued)

FOREIGN PATENT DOCUMENTS

| | | |
|---|---|---|
| JP | 2004-176819 | 6/2004 |
| JP | 2011-033164 | 2/2011 |

(Continued)

OTHER PUBLICATIONS

Japanese Notice of Allowance for Japanese Patent Application No. 2018-232914 dated Sep. 15, 2020.

*Primary Examiner* — Gregory A Blankenship
(74) *Attorney, Agent, or Firm* — Amin, Turocy & Watson, LLP

(57) ABSTRACT

An article-fixing device includes an adjustment mechanism and a protruding portion. The adjustment mechanism is interposed between a first plate and a second plate and is joined to a lower surface side of the first plate. The protruding portion is provided integrally with the adjustment mechanism. The protruding portion fixes an article to an upper surface of the first plate.

4 Claims, 12 Drawing Sheets

(56) References Cited

U.S. PATENT DOCUMENTS

| | | | |
|---|---|---|---|
| 2014/0009721 A1 | 1/2014 | Park | |
| 2014/0097218 A1 | 4/2014 | Bittner | |
| 2015/0146400 A1* | 5/2015 | Huffman | H05K 1/144 |
| | | | 361/790 |
| 2015/0291224 A1* | 10/2015 | Sahi | F16B 5/0233 |
| | | | 296/215 |
| 2015/0291225 A1* | 10/2015 | Yao | F16B 1/00 |
| | | | 296/203.01 |
| 2016/0362054 A1* | 12/2016 | Kerscher | B60R 9/04 |
| 2017/0036706 A1* | 2/2017 | Donabedian | B60R 13/07 |
| 2017/0045066 A1* | 2/2017 | Couto Maquieira | F16B 5/0233 |
| 2017/0240212 A1* | 8/2017 | Hinz | B62D 29/00 |
| 2019/0061828 A1* | 2/2019 | Yoshizawa | F16B 5/0657 |
| 2019/0185072 A1* | 6/2019 | Lee | B62D 25/06 |
| 2020/0148044 A1* | 5/2020 | Tsuyuzaki | B60R 13/0212 |
| 2020/0189492 A1* | 6/2020 | Hida | B60R 9/04 |
| 2020/0191183 A1* | 6/2020 | Hida | F16B 5/08 |
| 2020/0325685 A1* | 10/2020 | Figge | B60R 9/058 |
| 2020/0377155 A1* | 12/2020 | Wu | B62D 25/06 |
| 2021/0180628 A1* | 6/2021 | Yoen | F16B 37/061 |

FOREIGN PATENT DOCUMENTS

| | | |
|---|---|---|
| JP | 2015-181724 | 10/2015 |
| JP | 2015-230056 | 12/2015 |
| JP | 2017-019457 | 1/2017 |

\* cited by examiner

ARTICLE-FIXING DEVICE

CROSS-REFERENCE TO RELATED APPLICATION

Priority is claimed on Japanese Patent Application No. 2018-232914, filed on Dec. 12, 2018, the contents of which are incorporated herein by reference.

BACKGROUND

Field of the Invention

The present invention relates to an article-fixing device.

Background

As an article-fixing device, for example, a device that fixes a roof rail to a roof panel of a vehicle body via an adjustment mechanism is known. Specifically, in the article-fixing device, a supporting member attached to the vehicle body is disposed below the roof panel, and the adjustment mechanism is interposed between the supporting member and the roof panel. An upper end portion of the adjustment mechanism is exposed upward from an opening of the roof panel, and a fastening bolt that penetrates the supporting member and the adjustment mechanism from below protrudes above the roof panel and is screwed to a nut. The nut is attached to the roof rail.

That is, the roof rail is attached to the roof panel with the fastening bolt and is fixed in a state where the adjustment mechanism is interposed between the supporting member and the roof panel.

According to the article-fixing device, the adjustment mechanism and the nut are formed as separate members and are disposed in a state of being separated from each other. Therefore, a load input from the relatively heavy roof rail is mainly transmitted to the fastening bolt via the fastening nut (see, for example, U.S. Pat. No. 9,187,045).

SUMMARY

However, in the article-fixing device disclosed in U.S. Pat. No. 9,187,045, a load input from an article such as a roof rail is mainly transmitted to a fastening bolt via a nut. For this reason, it is difficult to appropriately transmit the load input from the article to the adjustment mechanism, and there is room for improvement from this viewpoint.

An aspect of the present invention aims to provide an article-fixing device which can appropriately transmit a load input from an article to an adjustment mechanism.

(1) An article-fixing device according to an aspect of the present invention includes: an adjustment mechanism which is interposed between a first plate and a second plate and is joined to a lower surface side of the first plate; and a protruding portion which is provided integrally with the adjustment mechanism and fixes an article to an upper surface of the first plate.

In this way, a load input from a relatively heavy article to the first plate and the protruding portion can be appropriately transmitted to the protruding portion and the adjustment mechanism. Thus, the load input from the article can be satisfactorily supported by the entire adjustment mechanism.

(2) In the article-fixing device, the protruding portion may be configured of a screw portion which is fixed by being screwed to the article, the adjustment mechanism may include one member which is provided integrally with the protruding portion and another member which can be screwed to the one member, and the article-fixing device may further include a fastening bolt which fastens the second plate to the other member.

In this way, the protruding portion is provided integrally with the one member of the adjustment mechanism, and the one member is screwed to the other member of the adjustment mechanism. Therefore, the protruding portion, the one member, and the other member can be integrated. Thus, the load input from the article can be appropriately transmitted to the adjustment mechanism via the protruding portion.

(3) In the article-fixing device, the protruding portion may be configured of a screw portion which is fixed by being screwed to the article and has a head portion, the adjustment mechanism may include one member having a bottom surface to which the head portion of the protruding portion is joined and another member which can be screwed to the one member, and the article-fixing device may further include a fastening bolt which fastens the second plate to the other member.

In this way, the protruding portion is configured of the screw portion, and the protruding portion is provided integrally with the one member by joining the head portion of the protruding portion to the bottom surface of the one member of the adjustment mechanism. Further, the one member is screwed to the other member of the adjustment mechanism. Therefore, the protruding portion, the one member, and the other member can be integrated. Thus, the load input from the article can be appropriately transmitted to the adjustment mechanism via the protruding portion.

Also, by joining the head portion of the protruding portion to the bottom surface of the one member, the protruding portion and the one member can be manufactured separately, and thus productivity can be improved.

(4) In the article-fixing device, the protruding portion may be configured of a screw portion which is fixed by being screwed into the article and includes a head portion in which an insertion screw hole is formed, the adjustment mechanism may include one cylindrical member into which the head portion of the protruding portion is pressed and another member which can be screwed to the one member, and the article-fixing device may further include a fastening bolt which fastens the second plate to the other member by passing through the other member and being screwed into the insertion screw hole.

In this way, the protruding portion is configured of the screw portion, the head portion of the protruding portion is pressed into the one member of the adjustment mechanism, and the fastening bolt is screwed into the insertion screw hole of the head portion. Further, the one member is screwed to the other member of the adjustment mechanism. Therefore, the protruding portion, the one member, and the other member can be integrated. Thus, the load input from the article can be appropriately transmitted to the adjustment mechanism via the protruding portion.

Also, by pressing the head portion of the protruding portion into the one member and screwing the fastening bolt into the insertion screw hole of the head portion, the protruding portion and the one member can be manufactured separately, and thus productivity can be improved.

(5) In the article-fixing device, the protruding portion may be configured of a screw portion including a first male screw which is fixed by being screwed to the article and a second male screw formed on a side opposite to the first male screw, the adjustment mechanism may include one member to which the second male screw can be screwed and another member which can be screwed to the one member, and the article-fixing device may further include a fastening bolt which fastens the second plate to the other member.

In this way, the protruding portion is configured of the screw portion, and the second male screw of the protruding portion is screwed to the one member of the adjustment mechanism. Further, the one member is screwed to the other member of the adjustment mechanism. Therefore, the protruding portion, the one member, and the other member can be integrated. Thus, the load input from the article can be appropriately transmitted to the adjustment mechanism via the protruding portion.

Also, by screwing the second male screw of the protruding portion into the one member, the protruding portion and the one member of the adjustment mechanism can be easily assembled. Furthermore, the protruding portion and the one member can be manufactured separately, and thus productivity can be improved.

(6) In the article-fixing device, the protruding portion may be configured of a nut portion which fixes the article by being screwed to a male screw of the article, the adjustment mechanism may include one member which is provided integrally with the protruding portion and another member which can be screwed to the one member, and the article-fixing device may further include a fastening bolt which fastens the second plate to the other member.

In this way, the protruding portion is provided integrally with the one member of the adjustment mechanism, and the one member is screwed to the other member of the adjustment mechanism. Therefore, the protruding portion, the one member, and the other member can be integrated. Thus, the load input from the article can be appropriately transmitted to the adjustment mechanism via the protruding portion.

Also, the protruding portion is configured of the nut portion and the protruding portion is provided integrally with the one member, whereby the screw hole can be formed up to the one member. Therefore, a depth dimension of the screw hole can be ensured in a state where a height dimension of the protruding portion is kept small. Further, the protruding portion is configured of the nut portion, so that an outer diameter dimension of the protruding portion can be made larger as compared with a case in which the protruding portion is formed with a screw portion. Thus, the load input from the article can be more appropriately transmitted to the adjustment mechanism via the protruding portion.

(7) In the article-fixing device, the protruding portion may include a discharge hole penetrating from the screw hole in which the male screw of the article is screwed to an outer circumferential surface of the protruding portion.

In this way, the discharge hole penetrating from the screw hole of the protruding portion to the outer circumferential surface of the protruding portion is formed. Therefore, for example, when electrodeposition coating is performed by immersing in an anti-corrosion coating liquid, excess coating liquid can be discharged from the screw hole to the outside of the protruding portion through the discharge hole such that excess coating liquid does not remain in the screw hole.

(8) In the article-fixing device, the second plate may be configured of a supporting member supported by an attachment portion on a vehicle body side, and the adjustment mechanism may be fixed to the attachment portion on the vehicle body side via the supporting member.

When the vehicle body is assembled, it is thought that a position of the attachment portion on the vehicle body side may deviate due to assembly tolerances or the like thereby changing a distance between the supporting member and the first plate. For this reason, the adjustment mechanism is interposed between the supporting member and the first plate. Thus, by adjusting the adjustment mechanism in accordance with a change in the distance between the supporting member and the first plate, the adjustment mechanism can absorb a variation in the distance between the supporting member and the first plate.

(9) In the article-fixing device, the supporting member may have an attachment hole which allows the fastening bolt fastened to the other member to pass therethrough and allows position adjustment in a direction intersecting an axial direction of the fastening bolt.

For example, it is thought that the supporting member and the first plate may deviate in a direction intersecting an axis direction of the fastening bolt. For this reason, the attachment hole of the supporting member is formed to allow adjustment of the position of the fastening bolt. Thus, by adjusting the position of the fastening bolt in accordance with a deviation between the supporting member and the first plate, a deviation between the supporting member and the first plate can be absorbed by the attachment hole.

(10) In the article-fixing device, a base end portion of the supporting member may be supported by the attachment portion on the vehicle body side, and the supporting member may have a brace which is provided at the base end portion and extends in a vehicle width direction.

In this way, by providing the brace to the supporting member, it is possible to reinforce the supporting member with the brace, particularly when the supporting member is cantilevered at the attachment portion on the vehicle body side. Therefore, when the load input from the article is transmitted to the supporting member via the adjustment mechanism, the transmitted load can be appropriately supported by the supporting member. Thus, the load transmitted to the supporting member can be satisfactorily transmitted to the vehicle body via the supporting member and the attachment portion on the vehicle body side.

(11) In the article-fixing device, the supporting member may be a cross member mounted on a left frame and a right frame.

In this way, by using the supporting member as the cross member, the cross member can be supported at both its ends on the left frame and the right frame. Thus, the rigidity of the cross member can be improved and the load input from article can be supported appropriately with the cross member. In particular, when the article is a roof rack, a relatively large load due to luggage on the roof rack can be appropriately supported by the cross member.

Also, by providing the cross member on the left frame and the right frame, for example, it is possible to support an impact load caused by a side impact input from the left frame or the right frame side with the cross member.

According to the aspect of the present invention, the protruding portion is provided integrally with the adjustment mechanism, and the article is attached to the first plate with the protruding portion. Thus, the load input from an article can be appropriately transmitted to the adjustment mechanism.

DESCRIPTION OF EMBODIMENTS

Figure 1:
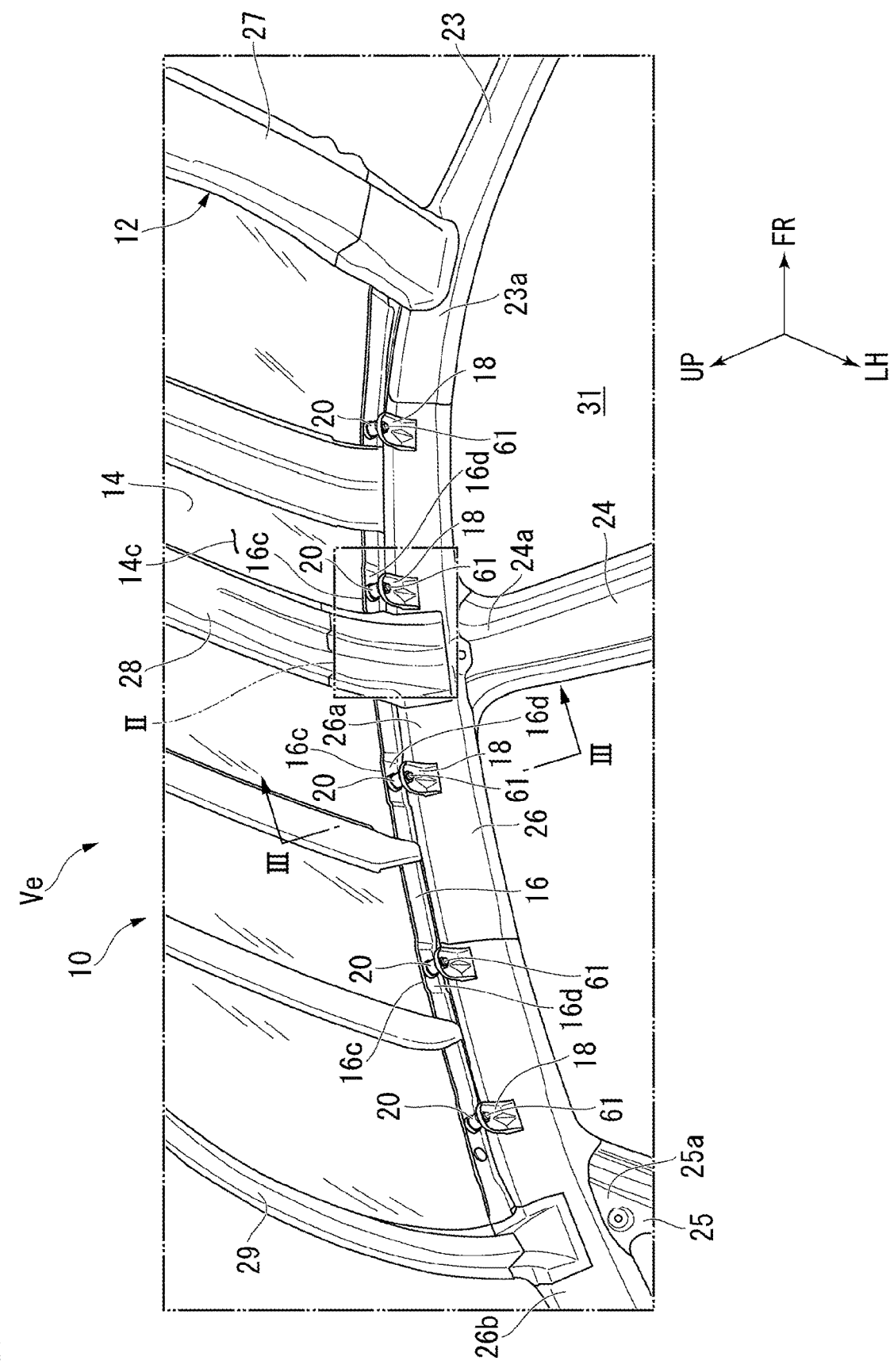
FIG. 1 is a perspective view of a vehicle body upper structure including an article-fixing device according to a first embodiment of the present invention when viewed from a passenger compartment side.

Hereinafter, an article-fixing device according to an embodiment of the present invention will be described with reference to the drawings. In the drawing, an arrow FR indicates forward in a vehicle, an arrow UP indicates upward in the vehicle, and an arrow LH indicates leftward in the vehicle. In the embodiment, although a left side of a vehicle body Ve will be described regarding an example of a vehicle body upper structure 10 including an article-fixing device 20, a right side of the vehicle body Ve is similarly configured.

First Embodiment

Figure 2:
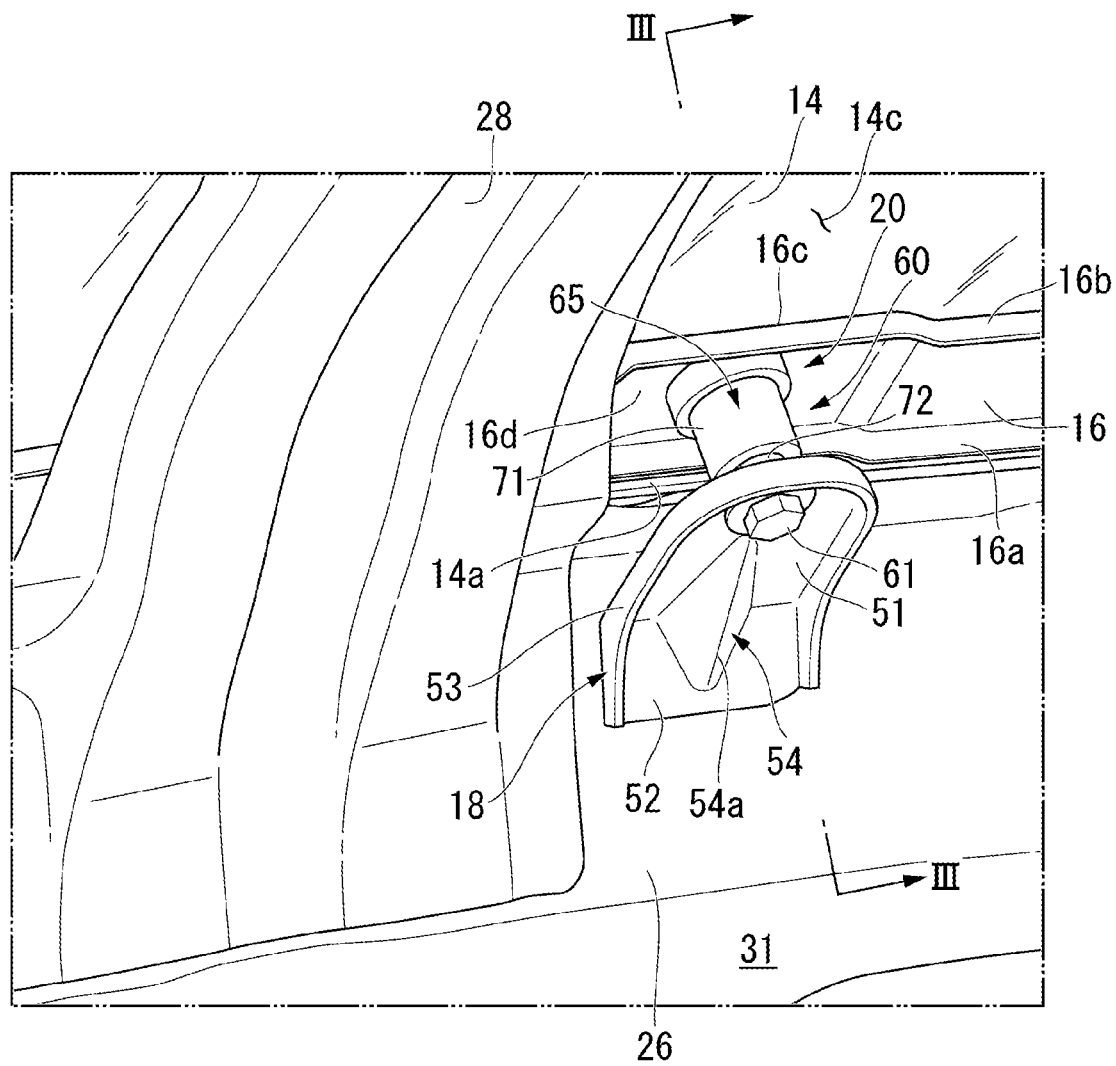
FIG. 2 is an enlarged perspective view of portion II of FIG. 1.
Figure 2:
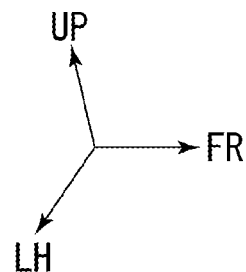
Figure 3:
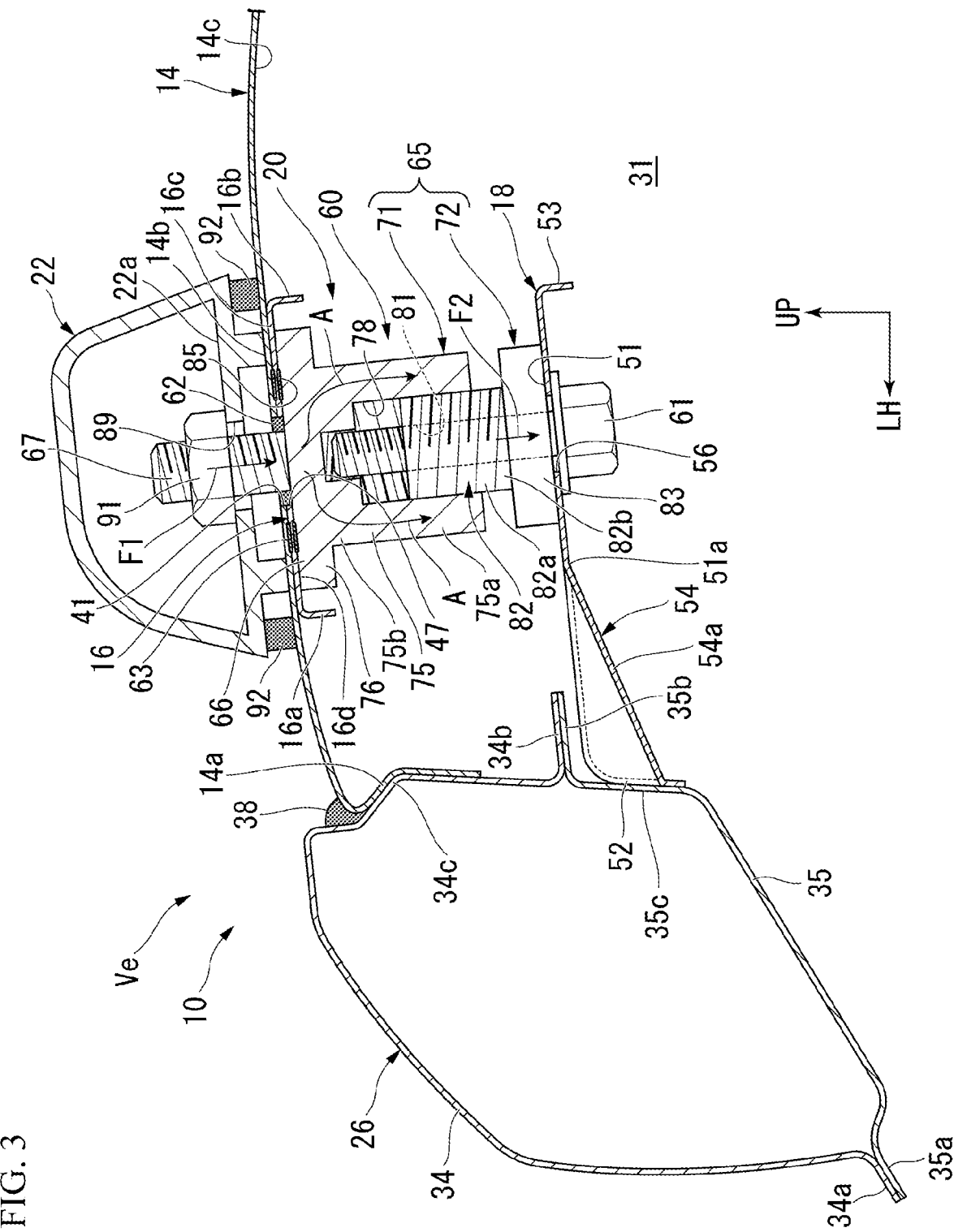
FIG. 3 is a cross-sectional view taken along line of FIG. 2.

As shown in FIGS. 1 and 2, the vehicle body upper structure 10 includes a vehicle body skeleton member 12, a roof panel (vehicle body panel or first plate) 14, a reinforcing member 16, and a plurality of supporting members (second plates) 18, a plurality of article-fixing devices 20, and a roof rail (an article) 22 (see FIG. 3).

The vehicle body skeleton member 12 includes a front pillar 23, a center pillar 24, a quarter pillar 25, a roof side rail 26, a front roof cross member 27, a center roof cross member 28, and a quarter roof cross member 29.

The front pillar 23 is raised at a front left side of a passenger compartment 31 and has a closed cross section. The front roof cross member 27 is mounted in a vehicle width direction across from an upper end 23a of the left front pillar 23 to an upper end portion of a right front pillar (not shown).

The center pillar 24 is raised at a central left side of the passenger compartment 31 and has a closed cross section. The quarter pillar 25 is raised to a rear left side of the passenger compartment 31 and has a closed cross section.

The roof side rail 26 is connected to an upper end 23a of the front pillar 23, an upper end 24a of the center pillar 24, and an upper end 25a of the quarter pillar 25.

As shown in FIG. 3, the roof side rail 26 includes, for example, an outer side rail 34 and an inner side rail 35. The outer side rail 34 forms an upper portion of the roof side rail 26, and has a first outer flange 34a protruding outward in the vehicle width direction and a first inner flange 34b protruding inward in the vehicle width direction. The inner side rail 35 forms a lower portion of the roof side rail 26, and has a second outer flange 35a protruding outward in the vehicle width direction and a second inner flange 35b protruding inward in the vehicle width direction.

The first outer flange 34a and the second outer flange 35a are joined to each other. The first inner flange 34b and the second inner flange 35b are joined to each other. Thus, the roof side rail 26 is formed in a closed cross section by the outer side rail 34 and the inner side rail 35.

Returning to FIG. 1, the center roof cross member 28 is mounted in the vehicle width direction across from a portion 26a of the left roof side rail 26 closer to a center in a longitudinal direction of the vehicle body to a portion (not shown) of the right roof side rail closer to a center in the longitudinal direction of the vehicle body. The quarter roof cross member 29 is mounted in the vehicle width direction across from a vehicle body rear portion 26b of the left roof side rail 26 to a vehicle body rear portion (not shown) of the right roof side rail.

The roof panel 14 is supported by the roof side rail 26, the front roof cross member 27, the center roof cross member 28, and the quarter roof cross member 29.

An outer periphery of the roof panel 14 is formed in a rectangular shape a plan view along the left roof side rail 26, the right roof side rail, the front roof cross member 27, and the quarter roof cross member 29.

As shown in FIG. 3, the roof panel 14 has a left portion (an outer portion) 14a formed along an inner portion 34c of the outer side rail 34, and the left portion 14a and the inner portion 34c are joined by brazing at a brazing joint portion 38. The roof panel 14 has a rail attachment portion 14b along the left portion 14a closer to the left portion 14a and a plurality of first through-holes (through-holes) 41 (see also FIG. 4) provided at intervals in the longitudinal direction of the vehicle body in the rail attachment portion 14b.

As shown in FIGS. 1 and 3, on a lower surface 14c of the roof panel 14, a reinforcing member 16 extends in a belt shape in the longitudinal direction of the vehicle body along the left portion 14a (see also FIG. 3). An outer side 16a of the reinforcing member 16 is bent downward. An inner side 16b of the reinforcing member 16 is bent downward. A plurality of raised portions 16c are formed in the reinforcing member 16 at intervals in the longitudinal direction of the vehicle body. The plurality of raised portions 16c are joined to the lower surface 14c of the roof panel 14.

Figure 4:
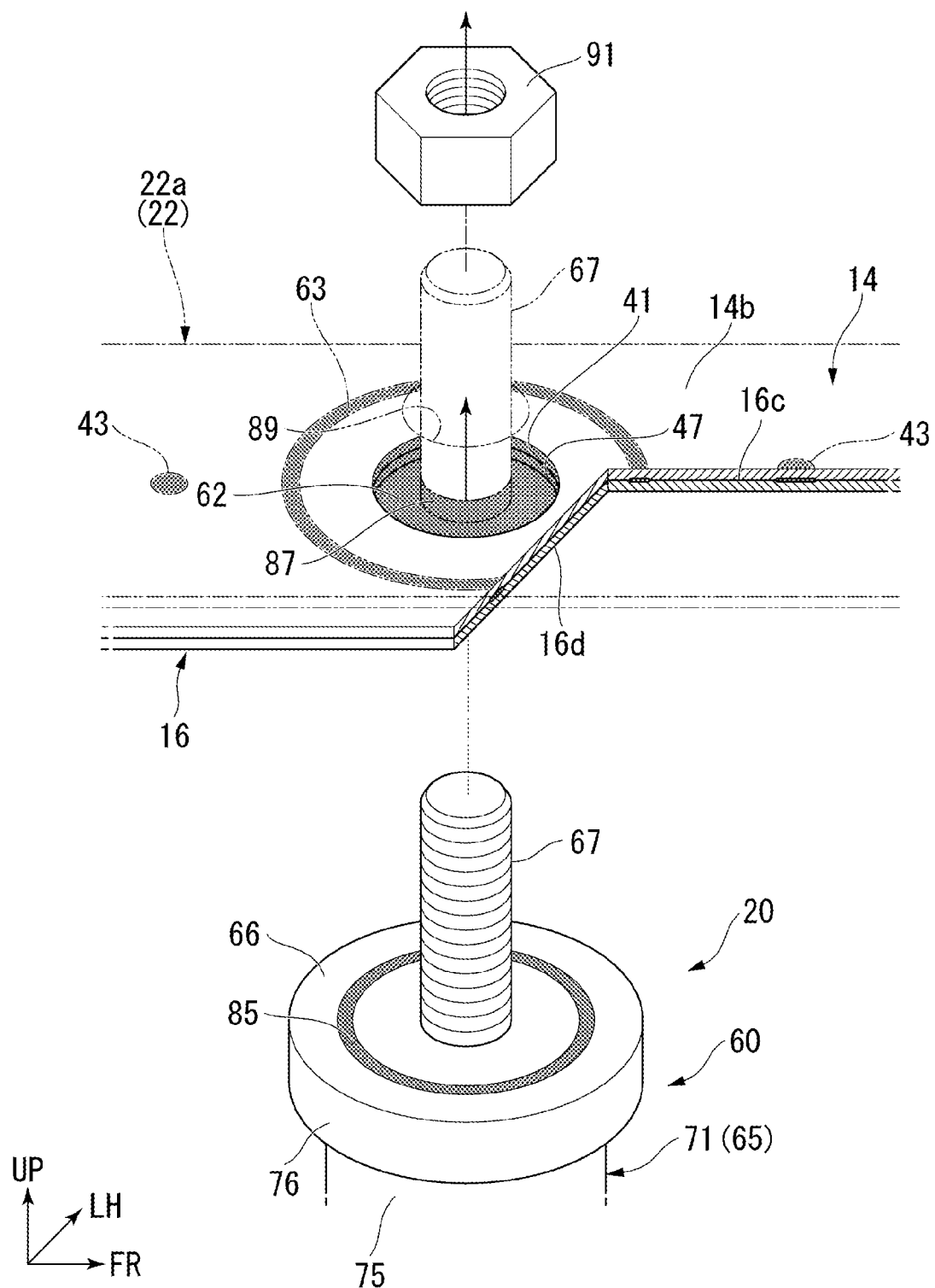
FIG. 4 is an exploded perspective view showing the article-fixing device according to the first embodiment.

As shown in FIGS. 3 and 4, the raised portion 16c of the reinforcing member 16 is positioned around a first through-hole 41 of the lower surface 14c of the roof panel 14, and is joined to a portion 43 covered with the roof rail 22 from above in the vehicle body, for example, by spot welding or an adhesive.

As described above, the reinforcing member 16 is joined to the portion 43 of the lower surface 14c of the roof panel 14 that is covered with the roof rail 22 from above in the vehicle body. Thus, since the portion 43 (for example, a welding dent when joining by spot welding, etc.) which joins the reinforcing member 16 to the roof panel 14 can be covered with the roof rail 22 from above in the vehicle body, the appearance (look) can be improved.

Further, a second seal material 63 is provided over the entire circumference of the first through-hole 41 between the raised portion 16c of the reinforcing member 16 and the lower surface 14c of the roof panel 14. The second seal material 63 will be described in detail later.

The raised portion 16c has a second through-hole 47. The second through-hole 47 is disposed below the first through-hole 41 of the roof panel 14.

A plurality of supporting members 18 (see also FIG. 1) are disposed at intervals below the plurality of raised portions 16c. The plurality of supporting members 18 are joined to an inner portion (an attachment portion on the vehicle body Ve side) 35c of the inner side rail 35. Hereinafter, the attachment portion 35c on the vehicle body Ve side is referred to as a "vehicle body side attachment portion 35c." The article-fixing device 20 is interposed between the reinforcing member 16 and the supporting member 18.

As shown in FIGS. 2 and 3, the supporting member 18 includes a support attachment portion 51, a base end portion 52, a peripheral portion 53, and a brace (gusset) 54. In the supporting member 18, for example, the support attachment portion 51, the base end portion 52, the peripheral portion 53, and the brace 54 are integrally formed of a single plate material.

The support attachment portion 51 is disposed under the raised portion 16c of the reinforcing member 16 and is formed flat along the raised portion 16c. For example, the support attachment portion 51 is formed in a curved shape with its tip protruding inward in the vehicle width direction, and its base end is formed in a straight line extending in the longitudinal direction of the vehicle body. The base end portion 52 is formed at the base end of the support attachment portion 51. The support attachment portion 51 has an attachment hole 56 in a portion near the tip.

The base end portion 52 is bent downward from the base end of the support attachment portion 51 along the vehicle body side attachment portion 35c. Since the base end portion 52 is joined to the vehicle body side attachment portion 35c, the supporting member 18 is cantilevered by the vehicle body side attachment portion 35c. The peripheral portion 53 is formed around the support attachment portion 51 and the base end portion 52. The peripheral portion 53 is bent downward from a periphery of the support attachment portion 51 and is bent from a periphery of the base end portion 52 toward the inside in the vehicle width direction. The support attachment portion 51 is reinforced by the peripheral portion 53.

The brace 54 is formed on the support attachment portion 51 and the base end portion 52. The brace 54 is provided on the base end portion 52 and the support attachment portion 51. A lower side 54a of the brace 54 extends with an upward slope from the base end portion 52 to a portion 51a closer to the attachment hole 56 of the support attachment portion 51 inward in the vehicle width direction (vehicle width inward direction). Thus, in the state where the supporting member 18 is supported by the vehicle body side attachment portion 35c in a cantilevered manner, the brace 54 is provided on the supporting member 18, whereby the supporting member 18 is reinforced by the brace 54 and strength and rigidity of the supporting member 18 are ensured.

As shown in FIGS. 3 and 4, the support attachment portion 51 of the supporting member 18 is disposed below the raised portion 16c of the reinforcing member 16 with a space therebetween. The article-fixing device 20 is interposed between the raised portion 16c and the support attachment portion 51.

The article-fixing device 20 includes a roof rail attachment member 60, a fastening bolt 61, a first seal material 62, and a second seal material 63. The roof rail attachment member 60 includes an adjustment mechanism 65, a head seat surface 66, and a protruding portion 67. The adjustment mechanism 65 includes a fitting recess member (one member) 71 and a fitting protrusion member (the other member) 72.

The fitting recess member 71 has a cylindrical portion 75 and a protruding top portion 76. The cylindrical portion 75 is formed into a hollow cylindrical shape by a cylindrical wall 75a, and a female screw 78 is formed on an inner circumferential surface of the cylindrical wall 75a.

The protruding top portion 76 is provided integrally with a top portion 75b of the cylindrical portion 75. The top portion 75b of the cylindrical portion 75 is closed by the protruding top portion 76. The protruding top portion 76 is formed in a disk shape, and protrudes radially outward from the cylindrical wall 75a of the cylindrical portion 75. The protruding top portion 76 has the head seat surface 66 formed in a circular shape on its upper surface. The protruding portion 67 protrudes from a center of the head seat surface 66 to the opposite side of the cylindrical portion 75. The protruding portion 67 is configured of a male screw portion. The head seat surface 66 and the protruding portion 67 will be described in detail later.

The fitting protrusion member 72 is fitted to the female screw 78 of the cylindrical portion 75 of the fitting recess member 71. The fitting protrusion member 72 includes a protruding portion screw hole 81 that passes through the fitting protrusion member 72 coaxially with the fitting protrusion member 72, a protruding shape portion 82, and a protruding bottom portion 83. A male screw 82a is formed on an outer circumferential surface of the protruding shape portion 82 to be screwable into the female screw 78 of the cylindrical portion 75. The male screw 82a of the protruding shape portion 82 is screwed into the female screw 78 of the cylindrical portion 75, so that the protruding shape portion 82 is fitted into the cylindrical portion 75 to be able to be extended and retracted. Thus, a dimension of the adjustment mechanism 65 in an axial direction thereof can be adjusted.

The protruding bottom portion 83 is provided integrally with the bottom portion 82b of the protruding shape portion 82. The protruding bottom portion 83 is formed in a disk shape and protrudes radially outward from an outer circumferential wall of the protruding shape portion 82. The protruding bottom portion 83 is placed on the support attachment portion 51 of the supporting member 18. In this state, the protruding portion screw hole 81 is disposed above the attachment hole 56 of the support attachment portion 51. The fastening bolt 61 penetrates the attachment hole 56 from below, and the penetrated fastening bolt 61 is screwed into the protruding portion screw hole 81. Thus, the fitting protrusion member 72 is fixed to the support attachment portion 51. In other words, the support attachment portion 51 is fastened to the fitting protrusion member 72 with the fastening bolt 61. That is, the adjustment mechanism 65 is fixed to the vehicle body side attachment portion 35c via the supporting member 18.

A shape of the attachment hole 56 of the supporting member 18 is formed to allow position adjustment in a direction intersecting an axial direction of the fastening bolt 61 in a state where the fastening bolt 61 penetrates therethrough. Specifically, for example, the attachment hole 56 is formed such that an inner diameter dimension thereof is larger than an outer diameter dimension of the fastening bolt 61 to allow position adjustment (a so-called clearance hole). As another example, it is possible to allow adjustment of the position in the direction intersecting the axial direction of the fastening bolt 61 by forming the attachment hole 56 as an elongated hole.

The head seat surface 66 and the protruding portion 67 are provided integrally with the protruding top portion 76 of the adjustment mechanism 65. The head seat surface 66 is formed in a circular shape by an upper surface of the protruding top portion 76. The head seat surface 66 is joined to a lower surface 16d of the reinforcing member 16 (specifically, the raised portion 16c) at an annular joint portion 85 over the entire circumference of the first through-hole 41 by, for example, ring projection welding, adhesive or the like. Therefore, the joint portion 85 closes a space between the head seat surface 66 and the lower surface 16d of the raised portion 16c over the entire outer circumference of the gap 87 between the first through-hole 41 and the protruding portion 67.

The protruding portion 67 protrudes from the head seat surface 66 of the protruding portion 67 coaxially with the fitting recess member 71. The protruding portion 67 is configured of a male screw portion. The protruding portion 67 penetrates the second through-hole 47 of the reinforcing member 16 and the first through-hole 41 of the roof panel 14 from a side inward from the reinforcing member 16 to a side outward from the roof panel 14 in the vehicle. The roof rail 22 is attached to the protruding portion 67 protruding upward from the roof panel 14.

Specifically, a base attachment hole 89 is formed in a base 22a of the roof rail 22. The protruding portion 67 that penetrates through the base attachment hole 89 protrudes above the base 22a. By screwing a nut 91 into the protruding portion 67 protruding upward from the base 22a, the roof rail 22 is attached to the protruding portion 67 and fixed to an upper surface of the roof panel 14.

In this state, a seal material 92 is interposed between an inner portion of the roof rail 22 and the upper surface of the roof panel 14. Also, the seal material 92 is interposed between an outer portion of the roof rail 22 and the upper surface of the roof panel 14.

In addition, the protruding portion 67 of the roof rail attachment member 60 protrudes to a side outward from the roof panel 14 in the vehicle. Therefore, when the roof rail 22 is attached to the roof panel 14, by fitting the base attachment hole 89 of the roof rail 22 into the protruding portion 67, the protruding portion 67 can be also used as a positioning reference for the roof rail 22. Thus, attachment workability at the time of attaching the roof rail 22 to the upper surface of the roof panel 14 can be improved.

When the vehicle body Ve is assembled, for example, it is thought that a position of the vehicle body side attachment portion 35c may deviate due to an assembly tolerance or the like. In addition, when the roof panel 14 is attached to the roof side rail 26 by brazing, a position of the roof panel 14 may deviate. For this reason, it is thought that a relative position between the supporting member 18 and the roof panel 14 may become displaced. Therefore, the adjustment mechanism 65 is interposed between the supporting member 18 and the roof panel 14 (specifically, the reinforcing member 16). Thus, by adjusting the adjustment mechanism 65 in accordance with a positional deviation between the supporting member 18 and the roof panel 14, the adjustment mechanism 65 can absorb a deviation of the position between the supporting member 18 and the roof panel 14.

Specifically, the fitting recess member 71 of the adjustment mechanism 65 is joined to the roof panel 14 via the reinforcing member 16, and the fitting protrusion member 72 of the adjustment mechanism 65 is fixed to the vehicle body side attachment portion 35c via the supporting member 18. Therefore, a vertical deviation of the position of the roof panel 14 when the roof panel 14 is brazed to the roof side rail 26, and a vertical deviation of the position of the supporting member when the supporting member 18 is fixed to the vehicle body side attachment portion 35c can be absorbed by adjusting a screwing state of the adjustment mechanism 65.

In the state where the roof panel 14 is attached to the roof side rail 26 and the supporting member 18 is attached to the vehicle body side attachment portion 35c, it is thought that the supporting member 18 and the roof panel 14 may deviate in a direction intersecting an axis direction of the fastening bolt 61.

Therefore, the attachment hole 56 of the supporting member 18 is formed to allow adjustment of the position of the fastening bolt 61 in the direction intersecting the axis direction. Thus, by adjusting the position of the fastening bolt 61 in accordance with the relative deviation of the position between the supporting member 18 and the roof panel 14, a deviation between the supporting member 18 and the roof panel 14 can be absorbed by the attachment hole.

Further, the protruding portion 67 is provided integrally with the adjustment mechanism 65, and the roof rail 22 is fixed to the roof panel 14 using the protruding portion 67. Therefore, a load F1 input from the roof rail 22 that is a relatively heavy object can be appropriately transmitted to the adjustment mechanism 65 as indicated by the arrow A via the protruding portion 67. Thus, the load F1 input from the roof rail 22 can be satisfactorily supported by the entire adjustment mechanism 65.

In addition, the protruding portion 67 is provided integrally with the fitting recess member 71 of the adjustment mechanism 65, and the fitting recess member 71 is screwed to the fitting protrusion member 72 of the adjustment mechanism 65. Therefore, the protruding portion 67, the fitting recess member 71, and the fitting protrusion member 72 can be integrated. Thus, the load F1 input from the roof rail 22 can be appropriately transmitted to the adjustment mechanism 65 via the protruding portion 67.

Furthermore, the reinforcing member 16 is joined to the lower surface 14c of the roof panel 14 around the first through-hole 41. Therefore, the roof panel 14 around the first through-hole 41 to which the relatively large load F1 is input from the protruding portion 67 and the roof rail 22 can be reinforced by the reinforcing member 16. Thus, an overall thickness dimension of the roof panel 14 can be reduced and a weight of the roof panel 14 (that is, the vehicle body) can be reduced.

In addition, the supporting member 18 is reinforced by the brace 54 by providing the brace 54 on the supporting member 18. Therefore, when the load F1 input from the roof rail 22 is transmitted to the supporting member 18 via the adjustment mechanism 65, the transmitted load F2 can be appropriately supported by the supporting member 18. Thus, the load F2 transmitted to the supporting member 18 can be satisfactorily transmitted to the vehicle body Ve via the supporting member 18 and the vehicle body side attachment portion 35c.

The first seal material 62 is provided in the gap 87 between the first through-hole 41 and the protruding portion 67. Examples of the first seal material 62 include a seal material that is applied in a liquid state at the time of use and is cured at room temperature after application, and a grommet. By providing the first seal material 62 in the gap 87 between the first through-hole 41 and the protruding portion 67, water permeation from the gap 87 to a side inward from the roof panel 14 in the vehicle is inhibited. Thus, a sealing effect which can inhibit water permeation from the roof panel 14 to the vehicle inner side with a simple configuration can be obtained.

Also, the head seat surface 66 is joined to the lower surface 16d of the reinforcing member 16 (specifically, the raised portion 16c), for example, at the annular joint portion 85 over the entire circumference of the first through-hole 41 and the second through-hole 47 by ring projection welding or an adhesive. Therefore, with a simple configuration in which the head seat surface 66 is joined to the lower surface 16d of the raised portion 16c, an annular sealing effect can be obtained over the entire outer circumference of the gap 87 between the first through-hole 41 and the protruding portion 67. Thus, a reliable sealing effect can be further enhanced with a simple sealing configuration.

Furthermore, the second seal material 63 is provided in an annular shape over the entire circumference of the first through-hole 41 and the second through-hole 47 between the raised portion 16c and the lower surface 14c of the roof panel 14. Examples of the second seal material 63 include a seal material that is applied in a liquid state at the time of use and is cured at room temperature after application.

In this way, by providing the second seal material 63 in an annular shape over the entire circumference of the first through-hole 41 and the second through-hole 47, the space between the raised portion 16c and the lower surface 14c of the roof panel 14 can be closed with the second seal material 63 over the entire circumference of the first through-hole 41. Thus, the sealing effect with respect to the gap 87 of the first through-hole 41 and the protruding portion 67 can be acquired, and a reliable sealing effect can further be enhanced with a simple sealing structure.

Next, an assembling method of the article-fixing device 20 according to the first embodiment will be described with reference to FIGS. 3 and 4.

As shown in FIGS. 3 and 4, in a first step, by screwing the male screw 82a of the fitting protrusion member 72 into the female screw 78 of the fitting recess member 71 of the adjustment mechanism 65, the fitting recess member 71 and the fitting protrusion member 72 (that is, the adjustment mechanism 65) are integrally connected to each other.

The protruding portion 67 is integrally provided with the adjustment mechanism 65. The protruding portion 67 protrudes from the second through-hole 47 of the reinforcing member 16 (specifically, the raised portion 16c). After the protruding portion 67 protrudes from the second through-hole 47, the head seat surface 66 is joined to the lower surface 16d of the raised portion 16c at the joint portion 85 together with the adjustment mechanism 65. By joining the head seat surface 66 to the lower surface 16d of the raised portion 16c, the protruding portion 67 protrudes from the first through-hole 41 of the roof panel 14 to the outside of the vehicle.

In a second step, the raised portion 16c of the reinforcing member 16 is fixed to the lower surface 14c of the roof panel 14 in a state where the protruding portion 67 protrudes from the first through-hole 41 of the roof panel 14 to the outside of the vehicle. Specifically, the raised portion 16c is joined to the portion 43 of the lower surface 14c of the roof panel 14 that is located around the first through-hole 41 and is covered with the roof rail 22 from above in the vehicle body.

In a third step, the adjustment mechanism 65 is fixed to the supporting member 18. Specifically, the protruding bottom portion 83 of the adjustment mechanism 65 is placed on the support attachment portion 51 of the supporting member 18. After the protruding bottom portion 83 is placed on the support attachment portion 51, the fastening bolt 61 is passed through the attachment hole 56 of the support attachment portion 51 from below, and the penetrated fastening bolt 61 is screwed into the protruding portion screw hole 81. As a result, the adjustment mechanism 65 is fixed to the support attachment portion 51.

In this state, by providing the first seal material 62 in the gap 87 between the first through-hole 41 and the protruding portion 67, water is inhibited from entering through the gap 87.

According to the assembling method of the article-fixing device 20, after the head seat surface 66 is fixed to the lower surface 16d of the raised portion 16c together with the adjustment mechanism 65 in the first step, the raised portion 16c (that is, the reinforcing member 16) is fixed to the roof panel 14 in the second step. Further, in the third step, the adjustment mechanism 65 is fixed to the supporting member 18 (that is, the support attachment portion 51). Thus, in the state in which the protruding portion 67 protrudes from the roof panel 14 to the outside of the vehicle, the adjustment mechanism 65 can be easily assembled to be interposed between the reinforcing member 16 and the supporting member 18.

Further, by providing the first seal material 62 in the gap 87 between the first through-hole 41 and the protruding portion 67, water is inhibited from entering a side inward from the roof panel 14 in the vehicle through the gap 87. Thus, the sealing effect which can inhibit water permeation from the roof panel 14 to the inside of the vehicle with a simple configuration can be obtained.

Next, vehicle body upper structures 100, 110, and 130 according to the second to fourth embodiments will be described with reference to FIGS. 5 to 9. In the vehicle body upper structures 100, 110, and 130 of the second to fourth embodiments, constituent members the same as or similar to those of the vehicle body upper structure 10 of the first embodiment are denoted by the same reference signs, and detailed descriptions thereof will be omitted.

Second Embodiment

Figure 5:
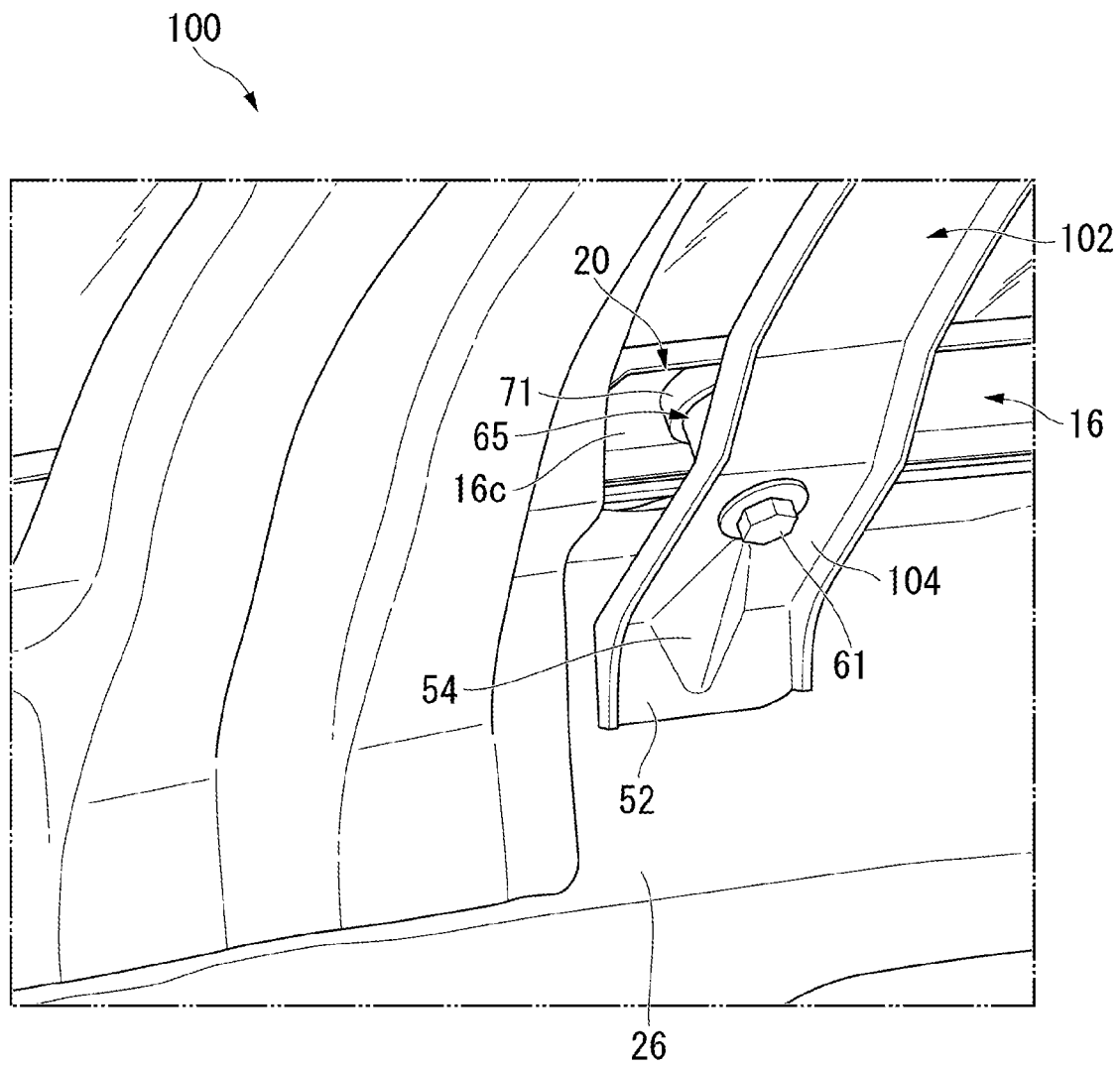
FIG. 5 is a perspective view of the vehicle body upper structure including an article-fixing device according to a second embodiment when viewed from the passenger compartment side.

As shown in FIG. 5, a vehicle body upper structure 100 is obtained by replacing the supporting member 18 of the first embodiment with a supporting member 102, and the other configurations are the same as those of the vehicle body upper structure 10 of the first embodiment.

The supporting member 102 is a cross member which is mounted on the left roof side rail (a left frame) 26 and the right roof side rail (a right frame) (not shown) and extends in the vehicle width direction along the roof panel 14.

Examples of the supporting member 102 include a roof arch that reinforces the roof panel 14 and the like, and a sunroof skeleton member that opens and closes the roof.

The supporting member 102 has a support attachment portion 104 at its left end portion. The support attachment portion 104 is provided below the raised portion 16c of the reinforcing member 16 with a gap therebetween, similarly to the support attachment portion 51 of the first embodiment. The adjustment mechanism 65 is interposed between the raised portion 16c of the reinforcing member 16 and the support attachment portion 104, as in the first embodiment.

According to the vehicle body upper structure 100, by employing the supporting member 102 as the cross member that is mounted across from the left roof side rail 26 to the right roof side rail, the supporting member 102 can be supported at both its ends by the left and right roof side rails 26. Thus, the rigidity of the supporting member 102 can be increased, and thus, when the article is the roof rail 22, the load input from the roof rail 22 can be appropriately supported by the supporting member 102. In addition, when a roof rack is used as the article, luggage is loaded on the roof rack. Even in this case, a relatively large load due to luggage on the roof rack can be satisfactorily supported by the supporting member 102.

Further, by mounting the supporting member 102 across from the left roof side rail 26 to the right roof side rail, for example, the supporting member 102 can satisfactorily support an impact load due to a side impact input from the left and right roof side rails 26.

Third Embodiment

Figure 6:
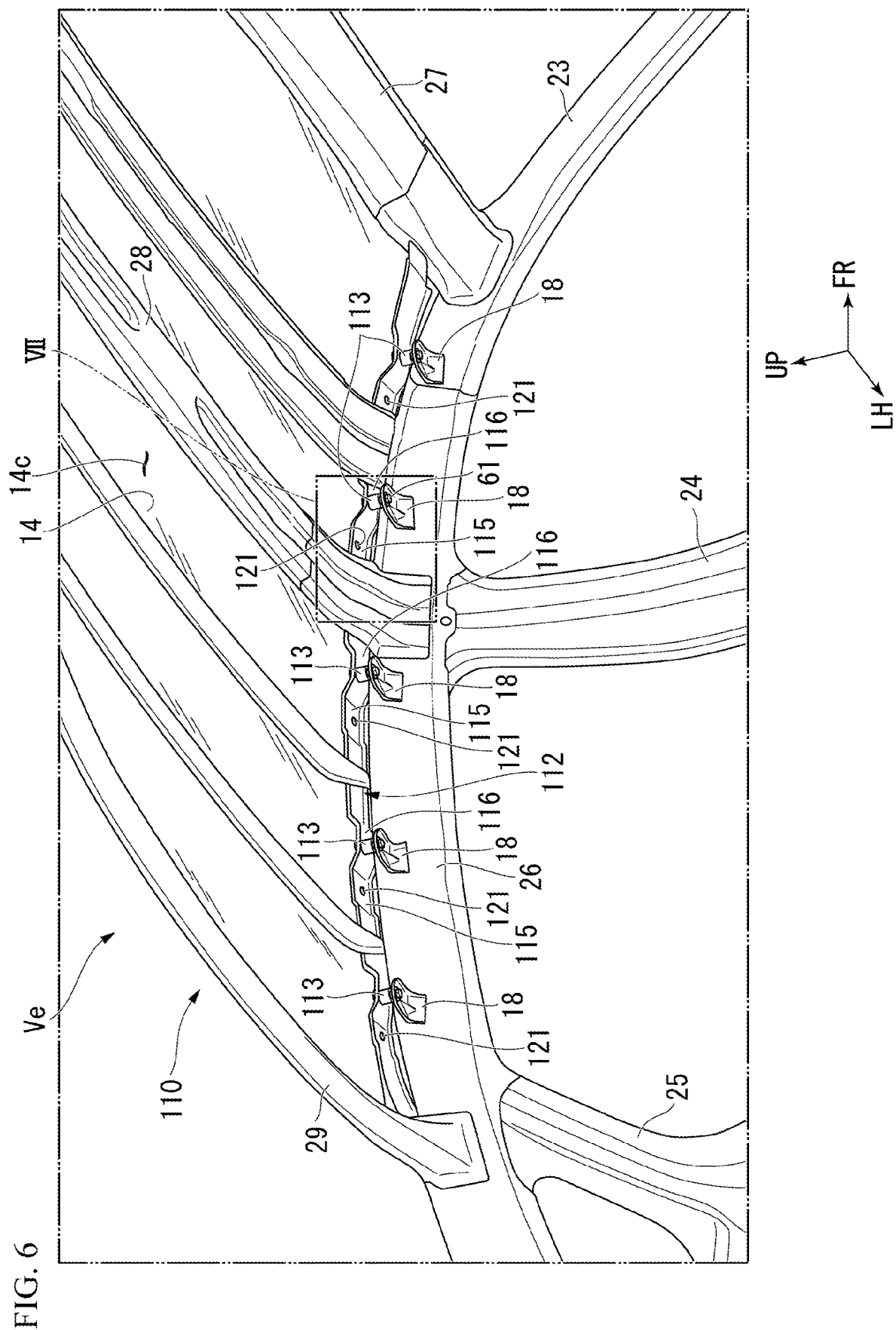
FIG. 6 is a perspective view of the vehicle body upper structure including an article-fixing device of a third embodiment when viewed from the passenger compartment side.
Figure 7:
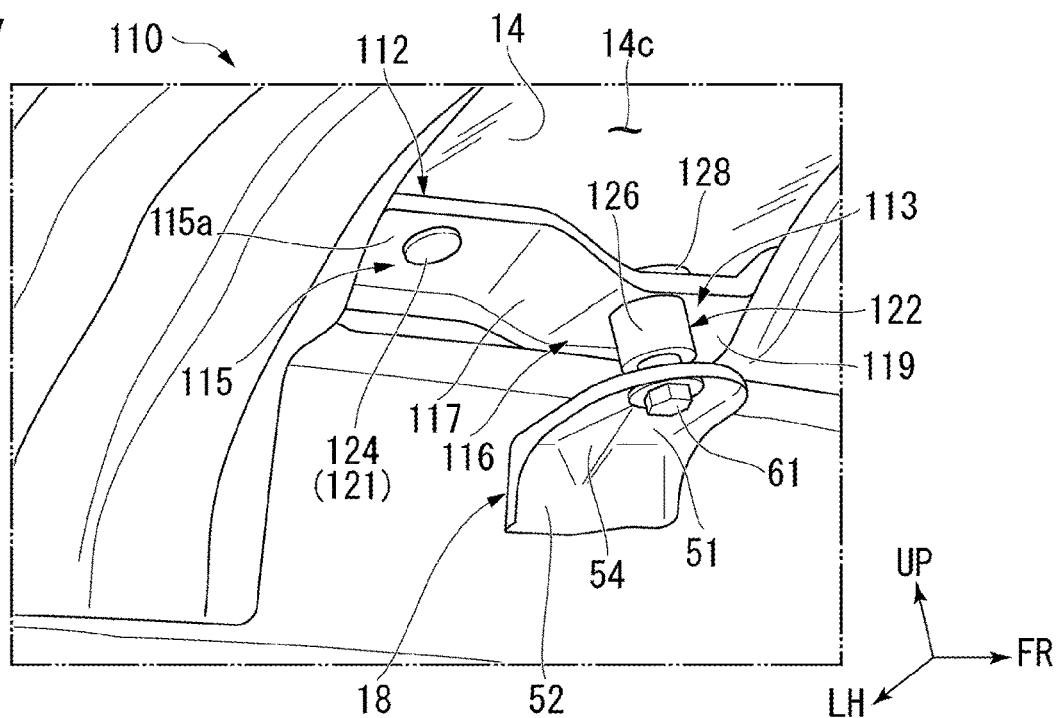
FIG. 7 is an enlarged perspective view of portion VII of FIG. 6.
Figure 8:
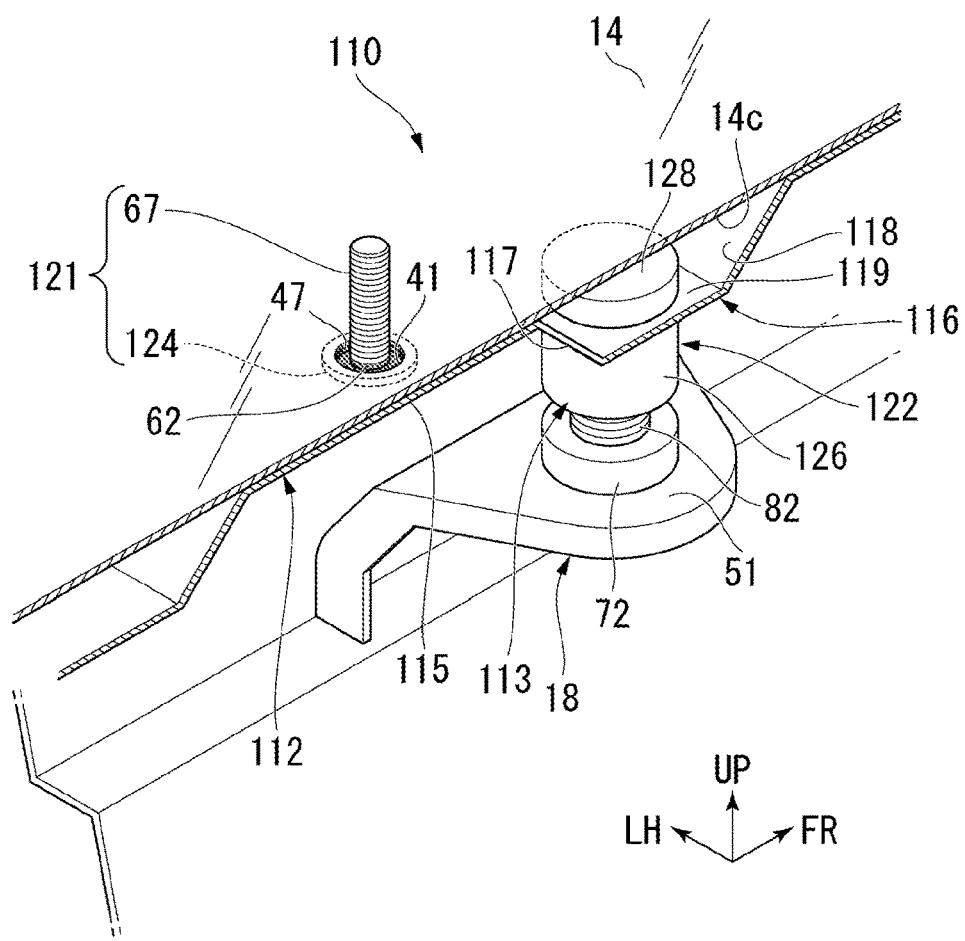
FIG. 8 is a perspective view showing the article-fixing device according to the third embodiment.

As shown in FIGS. 6 to 8, a vehicle body upper structure 110 is obtained by replacing the reinforcing member 16 and the roof rail attachment member 60 of the first embodiment with a reinforcing member 112 and a roof rail attachment member 113, and the other configurations are the same as those of the vehicle body upper structure 10 of the first embodiment.

The reinforcing member 112 has a plurality of first attachment fixing portions 115 to which the roof rail 22 (see FIG. 3) is fixed, and a plurality of second attachment fixing portions 116 to which the adjustment mechanism 122 of the roof rail attachment member 113 is fixed.

The first attachment fixing portion 115 is disposed in contact with the lower surface 14c of the roof panel 14. A fixing portion 121 of the roof rail attachment member 113 is fixed to the first attachment fixing portion 115. The second attachment fixing portion 116 is provided at a position that is offset in the longitudinal direction of the vehicle body with respect to the first attachment fixing portion 115.

In addition, the second attachment fixing portion 116 protrudes downward with respect to the first attachment fixing portion 115, thereby being disposed downward with an interval with respect to the lower surface 14c of the roof panel 14.

The second attachment fixing portion 116 has a front inclined portion 117, a rear inclined portion 118, and a central attachment portion 119. The front inclined portion 117 extends with a downward slope from a rear end of the first attachment fixing portion 115 rearward in the vehicle body. The rear inclined portion 118 is provided behind the front inclined portion 117 in the vehicle body with an interval therebetween and extends with an upward slope from a rear end of the central attachment portion 119 rearward in the vehicle body. The central attachment portion 119 is provided between a rear end of the rear inclined portion 118 and a front end of the front inclined portion 117 and is connected to the rear end of the rear inclined portion 118 and the front end of the front inclined portion 117. The central attachment portion 119 is disposed parallel to the support attachment portion 51 of the supporting member 18.

The roof rail attachment member 113 includes a fixing portion 121 and an adjustment mechanism 122. The fixing portion 121 is provided integrally with the protruding portion 67 and a head seat surface 124. The protruding portion 67 passes through the first through-hole 41 of the roof panel 14 and the second through-hole 47 (see also FIG. 4) of the first attachment fixing portion 115 and protrudes upward from the roof panel 14 toward the outside of the vehicle. In this state, the head seat surface 124 is joined to the lower surface 115a of the first attachment fixing portion 115. By attaching the roof rail 22 to the protruding portion 67, the roof rail 22 is fixed to the upper surface of the roof panel 14 by the fixing portion 121.

The adjustment mechanism 122 includes a fitting recess member (one member) 126 and a fitting protrusion member (the other member) 127. The fitting recess member 126 includes the cylindrical portion 75 and a connecting member 128. For example, the cylindrical portion 75 is disposed below the central attachment portion 119, the connecting member 128 is disposed above the central attachment portion 119, and the connecting member 128 is screwed onto an upper portion of the cylindrical portion 75, whereby the fitting recess member 126 is fixed to the central attachment portion 119.

When the protruding shape portion 82 of the fitting protrusion member 72 is screwed to the female screw 78 (see FIG. 3) of the fitting recess member 126 (specifically, the cylindrical portion 75), the fitting recess member 126 and the fitting protrusion member 72 (that is, the adjustment mechanism 122) are connected integrally to each other. The fitting protrusion member 72 is fixed to the support attachment portion 51 of the supporting member 18 by screwing the fastening bolt 61 into the protruding portion screw hole 81 (see FIG. 3) of the fitting protrusion member 72. In this state, the adjustment mechanism 122 is disposed at a position that is offset in the longitudinal direction of the vehicle with respect to the fixing portion 121 of the roof rail attachment member 113.

According to the vehicle body upper structure 110, by offsetting the adjustment mechanism 122 and the fixing portion 121 in the longitudinal direction of the vehicle body, the adjustment mechanism 122 and the fixing portion 121 can each be disposed at suitable positions. Specifically, the fixing portion 121 can be disposed at a position where the roof rail 22 can be appropriately supported (for example, the center of the roof rail 22), and the adjustment mechanism 122 can be disposed in the vicinity of the center pillar 24 that is a skeleton member of the vehicle body Ve.

Therefore, the load transmitted from the roof rail 22 to the fixing portion 121 can be appropriately distributed to the reinforcing member 112, and the load transmitted from the fixing portion 121 to the adjustment mechanism 122 via the reinforcing member 112 can be further appropriately transmitted to the center pillar 24 (that is, the vehicle body Ve). Thus, the load input from the roof rail 22 can be satisfactorily supported by the vehicle body Ve.

Also, the second attachment fixing portion 116 is disposed downward with an interval with respect to the lower surface 14c of the roof panel 14. Therefore, the central attachment portion 119 of the second attachment fixing portion 116 can be disposed parallel to the support attachment portion 51 of the supporting member 18. The fitting recess member 126 of the adjustment mechanism 122 is fixed to the central attachment portion 119, and the fitting protrusion member 72 of the adjustment mechanism 122 is fixed to the support attachment portion 51. Therefore, for example, in the aspect in which the roof panel 14 is formed in a curved surface that protrudes outside the vehicle body, it is unnecessary to provide the adjustment mechanism 122 with a configuration corresponding to the curved surface of the roof panel 14, and the adjustment mechanism 122 can be simplified.

Further, by having the front inclined portion 117 and the rear inclined portion 118 in the second attachment fixing portion 116, the rigidity of the reinforcing member 112 can be increased by the front inclined portion 117 and the rear inclined portion 118. Thus, the load of the roof rail 22 can be appropriately transmitted to the central attachment portion 119 via the fixing portion 121. Thus, the load transmitted to the central attachment portion 119 is transmitted to the adjustment mechanism 122.

Fourth Embodiment

Figure 9:
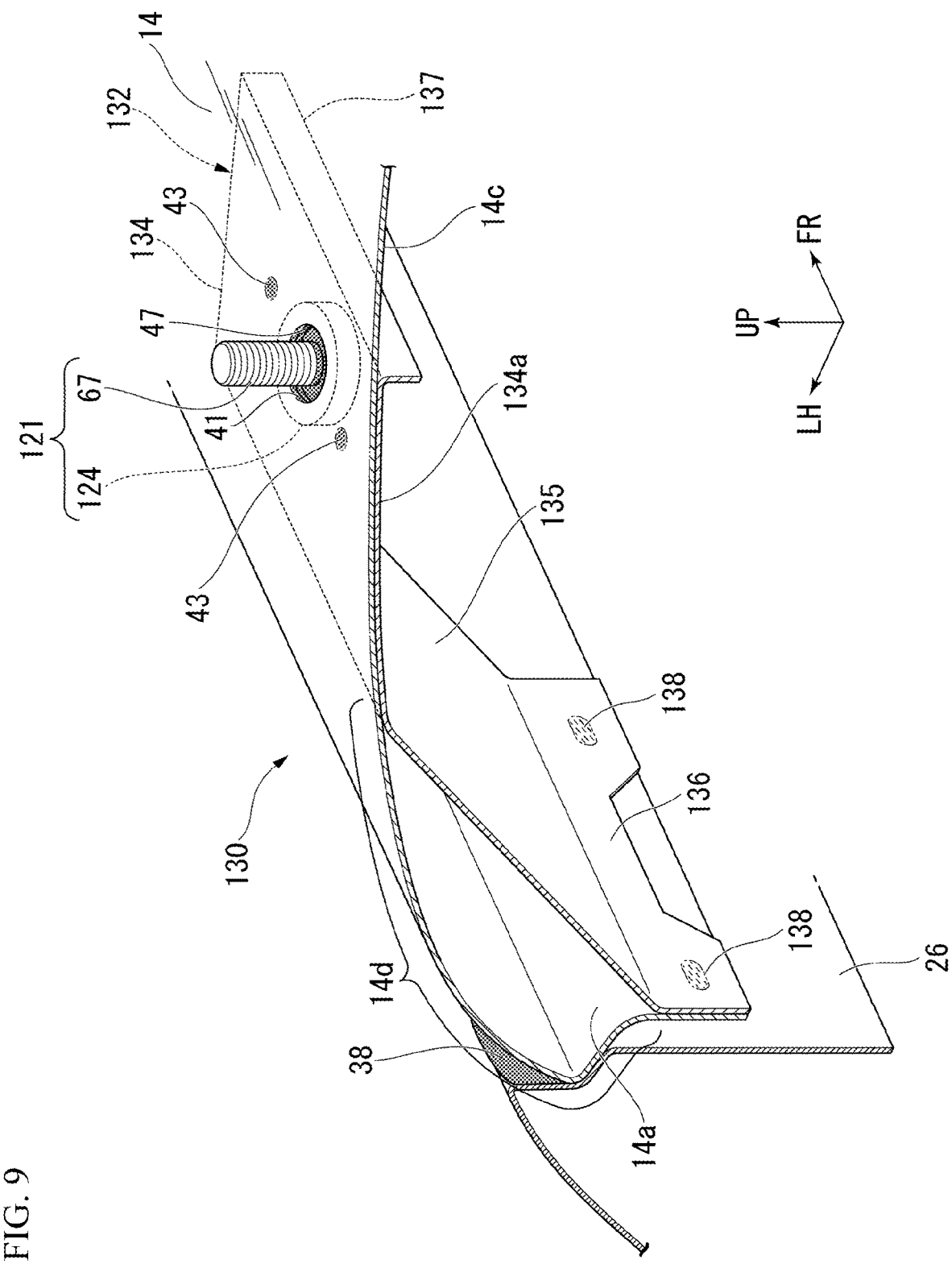
FIG. 9 is a perspective view showing a vehicle body upper structure according to a fourth embodiment.

As shown in FIG. 9, a vehicle body upper structure 130 is obtained by replacing the reinforcing member 112 of the third embodiment with a plurality of reinforcing members 132 and eliminating the supporting member 18 and the adjustment mechanism 122 from the third embodiment, and the other configurations are the same as those of the vehicle body upper structure 10 of the third embodiment.

The plurality of reinforcing members 132 are disposed along the roof side rail 26 at intervals in the longitudinal direction of the vehicle body. The reinforcing member 132 includes a reinforcing attachment portion 134, a reinforcing inclined portion 135, a reinforcing base end portion 136, and a bent side 137.

The reinforcing attachment portion 134 is formed in, for example, a rectangular shape in plan view, and in a state where the lower surface 14c of the roof panel 14 comes into contact therewith from below, the reinforcing attachment portion 134 is joined at the portion 43 of the roof panel 14 that is covered with the roof rail 22 from above in the vehicle body. The bent side 137 is bent downward from an inner end of the reinforcing attachment portion 134.

In addition, the reinforcing inclined portion 135 extends from an outer end of the reinforcing attachment portion 134 to incline with a downward slope toward the left portion 14a of the roof panel 14. The reinforcing base end portion 136 is bent downward along the left portion 14a of the roof panel 14 from an outer side of the reinforcing inclined portion 135.

The reinforcing base end portion 136 is joined to the left portion 14a of the roof panel 14 at a MIG joint portion 138, for example, by MIG welding. Therefore, a substantially triangular closed section is formed by the reinforcing inclined portion 135 and a left region portion 14d of the roof panel 14. The left region portion 14d includes a part of the left portion 14a. The MIG joint portion 138 is disposed at a position that is offset in the longitudinal direction of the vehicle body with respect to the fixing portion 121, which will be described later.

The fixing portion 121 is fixed to the reinforcing attachment portion 134 similarly to the third embodiment. That is, the fixing portion 121 is provided integrally with the protruding portion 67 and the head seat surface 124. The protruding portion 67 passes through the first through-hole 41 of the roof panel 14 and the second through-hole 47 of the reinforcing attachment portion 134 and protrudes upward from the roof panel 14 toward the outside of the vehicle. In this state, the head seat surface 124 is joined to the lower surface 134a of the reinforcing attachment portion 134.

By attaching the roof rail 22 (see FIG. 3) to the protruding portion 67, the roof rail 22 is fixed to the upper surface of the roof panel 14 by the fixing portion 121.

According to the vehicle body upper structure 130, the reinforcing inclined portion 135 and the roof panel 14 form a substantially triangular closed cross section. Therefore, the strength and rigidity of the reinforcing attachment portion 134 joined to the roof panel 14 in the reinforcing member 132 can be increased, and the positional accuracy of the reinforcing attachment portion 134 can be increased. Thus, it becomes possible to support the load of the roof rail 22 (see FIG. 3) with the reinforcing attachment portion 134, and the adjustment mechanism 122 of the third embodiment can be made unnecessary. That is, according to the fourth embodiment, the fixing portion 121 constitutes the roof rail attachment member.

Also, the fixing portion 121 is disposed at a position offset in the longitudinal direction of the vehicle body with respect to the MIG joint portion 138 of MIG welding. Thus, when the load of the roof rail 22 is input to the reinforcing attachment portion 134, it is possible to avoid stress concentration on the MIG joint portion 138 due to the input load.

Further, the reinforcing inclined portion 135 and the roof panel 14 form a substantially triangular closed section. Therefore, when the load of the roof rail 22 is input to the reinforcing attachment portion 134, it is possible to avoid stress concentration on the brazing joint portion 38.

In the fourth embodiment, although an example in which the plurality of reinforcing members 132 are disposed at intervals in the longitudinal direction of the vehicle body has been described, as another example, for example, the reinforcing members 132 can integrally extend over the entire region of the vehicle body in the longitudinal direction.

Next, roof rail attachment members 140, 150, 160, and 170 according to the fifth to eighth embodiments will be described with reference to FIGS. 10 to 14. In the roof rail attachment members 140, 150, 160, and 170 of the fifth to eighth embodiments, constituent members the same as or similar to the roof rail attachment member 60 of the first embodiment are denoted by the same reference signs, and detailed descriptions thereof will be omitted.

Fifth Embodiment

Figure 10:
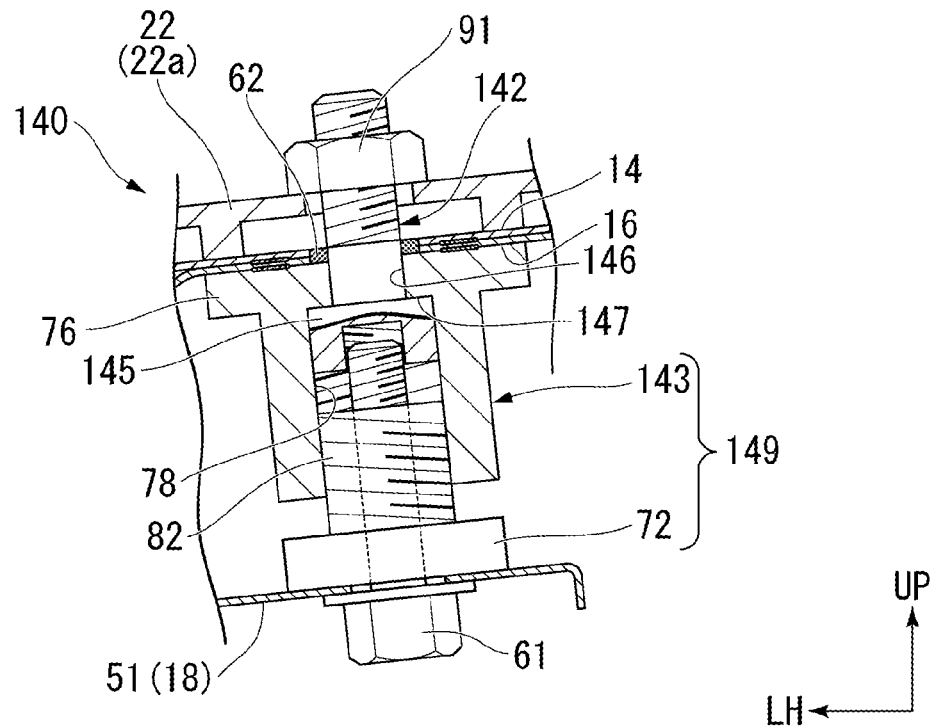
FIG. 10 is a cross-sectional view showing an article-fixing device according to a fifth embodiment.

As shown in FIG. 10, the roof rail attachment member 140 is obtained by replacing the protruding portion 67 and the fitting recess member 71 of the first embodiment with a protruding portion 142 and a fitting recess member (one member) 143, and the other configurations are the same as those of the roof rail attachment member 60 of the first embodiment.

The protruding portion 142 is configured of a screw portion having a head portion 145 at its base end portion. In the fitting recess member 143, a protruding through-hole 146 is formed along an axis at a center of the protruding top portion 76 of the first embodiment, and a bottom surface 147 of the cylindrical portion 75 is formed on an inner surface of the protruding top portion 76.

The protruding portion 142 is inserted from the female screw 78 side of the fitting recess member 143 and protrudes to the outside of the fitting recess member 143 from the protruding through-hole 146. In this state, the head portion 145 of the protruding portion 142 is joined to the bottom surface 147 of the cylindrical portion 75. Thus, the protruding portion 142 is provided integrally with the fitting recess member 143.

Examples of means for joining the head portion 145 and the bottom surface 147 include projection welding, MIG welding, laser welding, an adhesive or the like.

According to the roof rail attachment member 140, the protruding portion 142 is provided integrally with the fitting recess member 143 by joining the head portion 145 of the protruding portion 142 to the bottom surface 147 of the cylindrical portion 75. Further, the protruding shape portion 82 of the fitting protrusion member 72 is screwed to the female screw 78 of the fitting recess member 143. Therefore, the protruding portion 142, the fitting recess member 143, and the fitting protrusion member 72 can be integrated. Thus, the load input from the roof rail 22 can be appropriately transmitted to the fitting recess member 143 and the fitting protrusion member 72 (that is, the adjustment mechanism 149) via the protruding portion 142.

In addition, by joining and integrating the head portion 145 of the protruding portion 142 with the bottom surface 147 of the fitting recess member 143, the protruding portion 142 and the fitting recess member 143 can be manufactured separately, and thus productivity can be improved.

Sixth Embodiment

Figure 11:
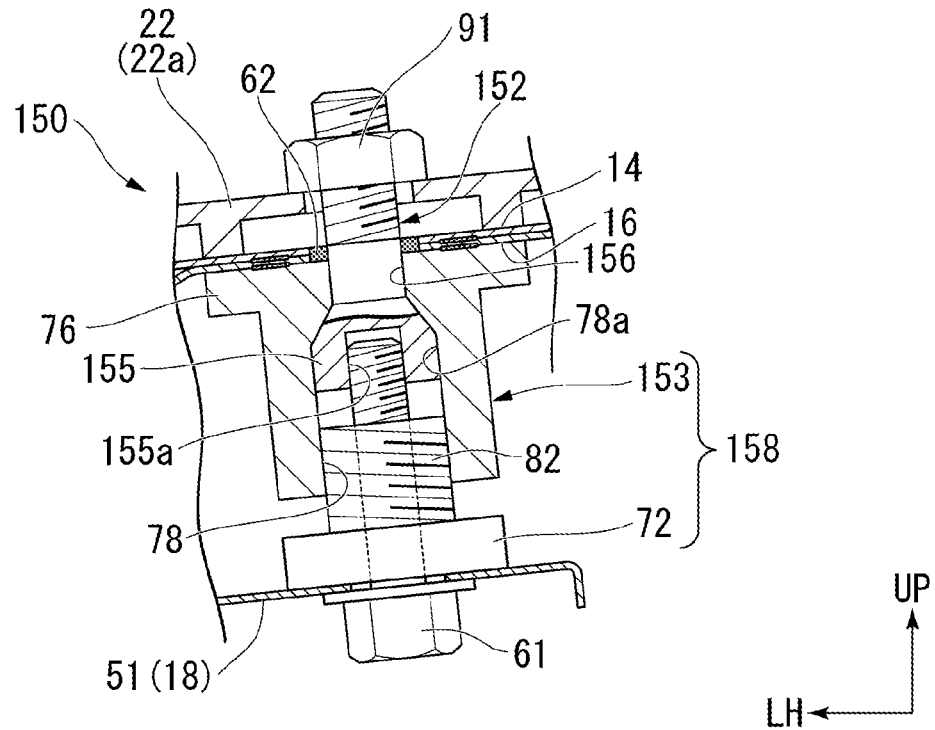
FIG. 11 is a cross-sectional view showing an article-fixing device according to a sixth embodiment.

As shown in FIG. 11, the roof rail attachment member 150 is obtained by replacing the protruding portion 67 and the fitting recess member 71 of the first embodiment with a protruding portion 152 and a fitting recess member (one member) 153, and the other configurations are the same as those of the roof rail attachment member 60 of the first embodiment.

The protruding portion 152 is configured of a screw portion having a head portion 155 at its base end portion. An insertion screw hole 155a is formed in the head portion 155. The fitting recess member 153 has a protruding through-hole 156 formed along the axis at the center of the protruding top portion 76 of the first embodiment. Furthermore, in the fitting recess member 153, a portion on the bottom portion side of the female screw 78 (hereinafter referred to as a bottom side portion) 78a is formed to be able to press the head portion 155, and a part of the bottom side portion 78a is formed such that a diameter thereof gradually reduces toward the protruding through-hole 156.

The protruding portion 152 is inserted from the female screw 78 side of the fitting recess member 153 and protrudes to the outside of the fitting recess member 153 from the protruding through-hole 156. In this state, the head portion 155 of the protruding portion 152 is pressed against the bottom side portion 78a of the female screw 78. Further, the fastening bolt 61 is screwed into the insertion screw hole 155a in a state where the protruding shape portion 82 of the fitting protrusion member 72 is screwed to the female screw 78 of the fitting recess member 143. Thus, the protruding portion 152, the fitting recess member 153, and the fitting protrusion member 72 are integrated.

According to the roof rail attachment member 150, the protruding portion 152, the fitting recess member 153, and the fitting protrusion member 72 are integrated. Thus, the load input from the roof rail 22 can be appropriately transmitted to the fitting recess member 153 and the fitting protrusion member 72 (that is, the adjustment mechanism 158) via the protruding portion 152.

Also, by pressing the head portion 155 of the protruding portion 152 into the fitting recess member 153 and screwing and integrating the fastening bolt 61 with the insertion screw hole 155a of the head portion 155, the protruding portion 152 and the fitting recess member 153 can be manufactured separately, and thus productivity can be improved.

Seventh Embodiment

Figure 12:
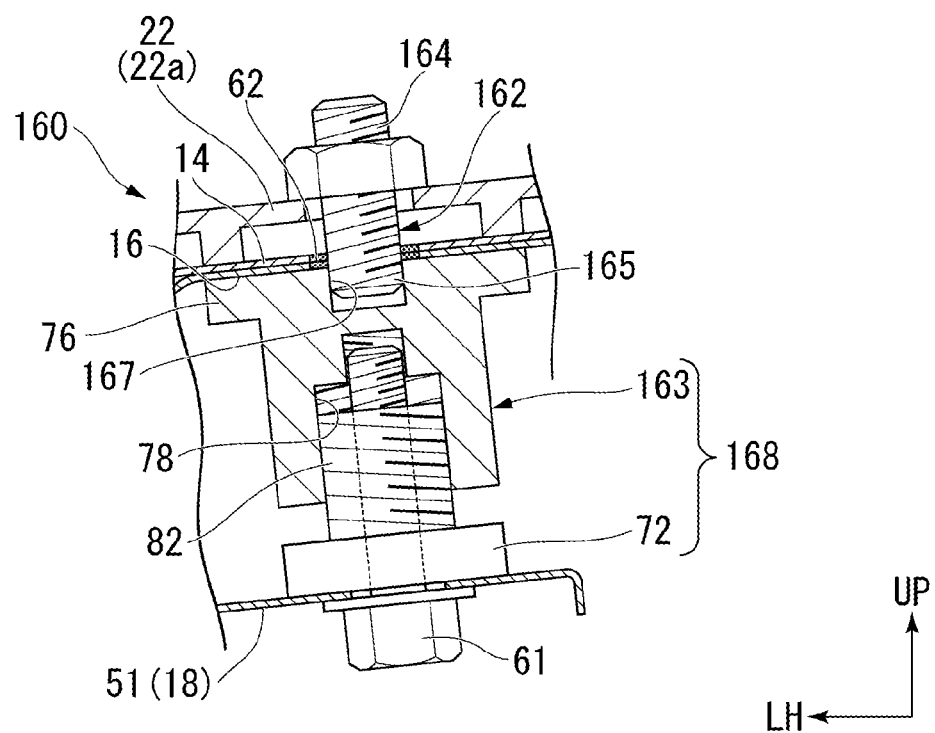
FIG. 12 is a cross-sectional view showing an article-fixing device according to a seventh embodiment.

As shown in FIG. 12, the roof rail attachment member 160 is obtained by replacing the protruding portion 67 and the fitting recess member 71 of the first embodiment with a protruding portion 162 and a fitting recess member (one member) 163, and the other configurations are the same as those of the roof rail attachment member 60 of the first embodiment.

The protruding portion 162 is configured of a screw portion having a first male screw 164 and a second male screw 165. The first male screw 164 fixes the roof rail 22 by being screwed to the roof rail 22. The second male screw 165 is formed on a side opposite to the first male screw 164.

The fitting recess member 163 is formed such that a top screw hole 167 can be screwed with the second male screw 165 along the axis at the center of the protruding top portion 76 of the first embodiment.

The second male screw 165 of the protruding portion 162 is screwed into the top screw hole 167 of the protruding top portion 76. Thus, the protruding portion 162 is provided integrally with the protruding top portion 76. In this state, the first male screw 164 protrudes from the roof panel 14 to the outside of the vehicle. Thus, the protruding portion 162 is provided integrally with the fitting recess member 163. Also, the roof rail 22 is attached to the first male screw 164 protruding from the roof panel 14.

According to the roof rail attachment member 160, the protruding portion 162 is provided integrally with the fitting recess member 163, and the protruding shape portion 82 of the fitting protrusion member 72 is screwed to the female screw 78 of the fitting recess member 163.

Therefore, the protruding portion 162, the fitting recess member 163, and the fitting protrusion member 72 can be integrated. Thus, the load input from the roof rail 22 can be appropriately transmitted to the fitting recess member 163 and the fitting protrusion member 72 (that is, the adjustment mechanism 168) via the protruding portion 162.

In addition, by screwing the second male screw 165 of the protruding portion 162 into the top screw hole 167 of the fitting recess member 163 and integrating them, the fitting recess member 163 can be easily assembled. Further, the protruding portion 162 and the fitting recess member 163 can be manufactured separately, and thus productivity can be improved.

Eighth Embodiment

Figure 13:
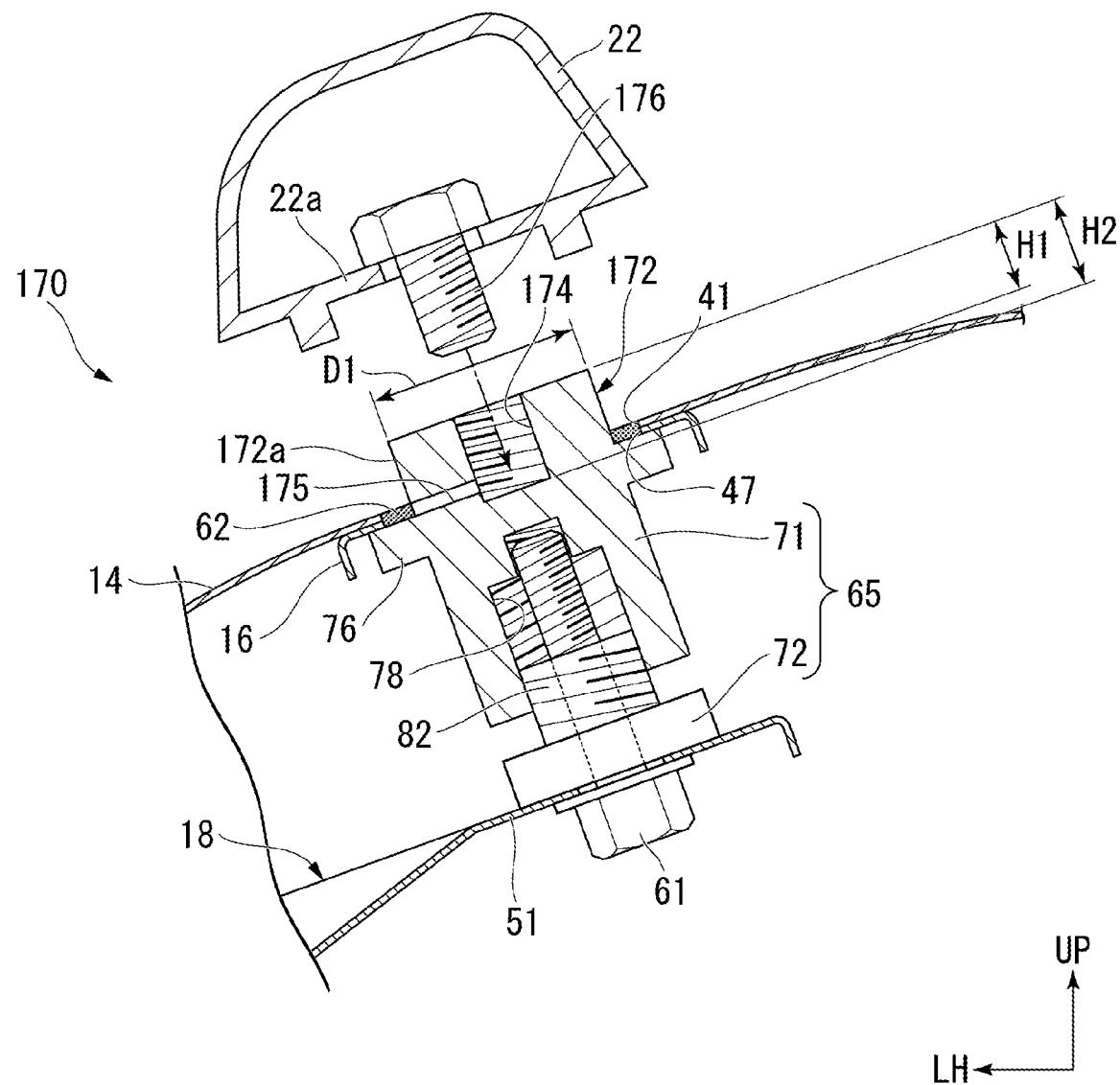
FIG. 13 is a cross-sectional view showing an article-fixing device according to an eighth embodiment.
Figure 14:
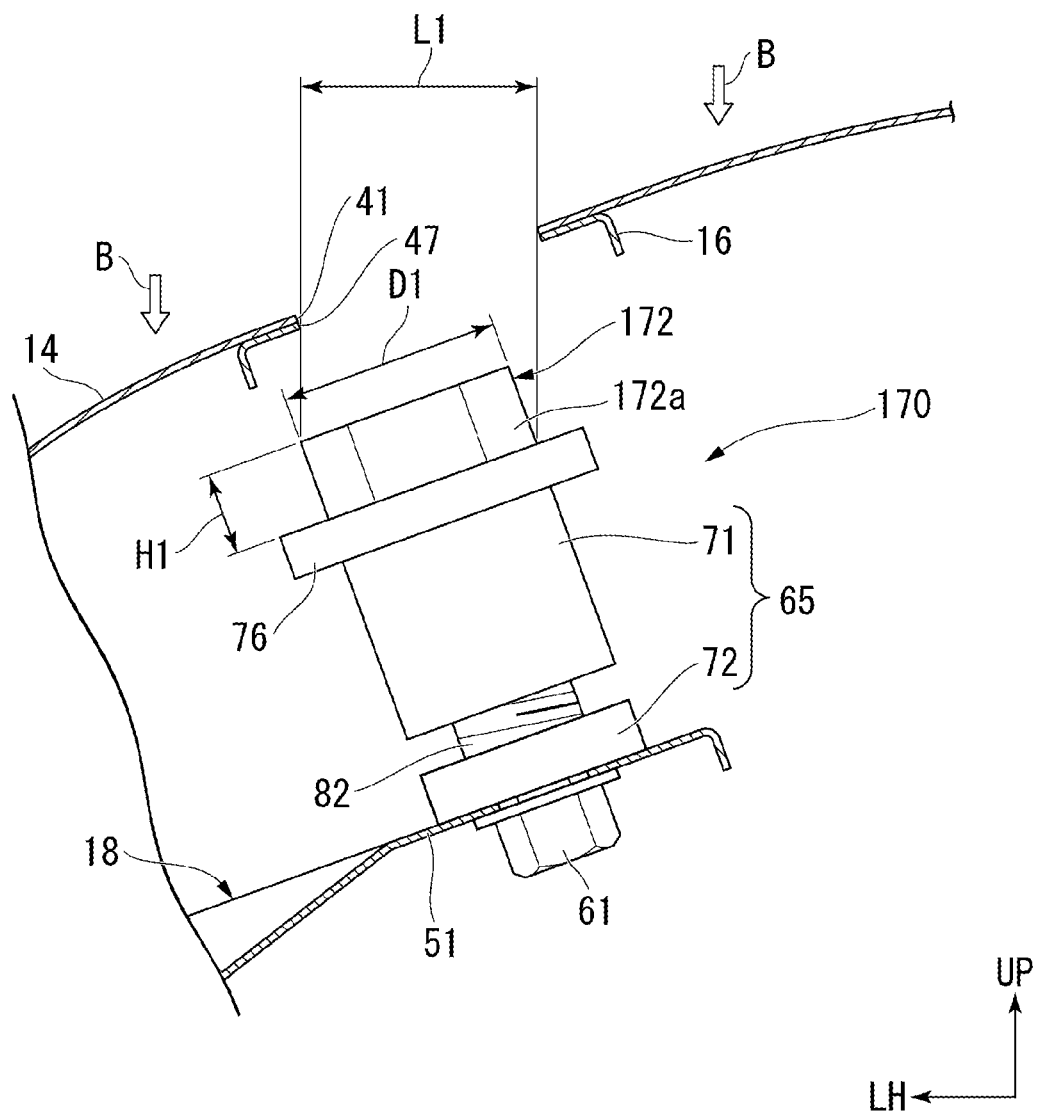
FIG. 14 is a side view illustrating an example in which a roof panel is attached to the article-fixing device according to the eighth embodiment.

As shown in FIGS. 13 and 14, the roof rail attachment member 170 is obtained by replacing the protruding portion 67 of the first embodiment with a protruding portion 172, and the other configurations are the same as those of the roof rail attachment member 60 of the first embodiment.

The protruding portion 172 is configured of a nut portion and is integrally formed to protrude from the protruding top portion 76 of the fitting recess member 71. The protruding portion 172 has a nut screw hole 174 and a discharge hole 175. The discharge hole 175 is penetrated from the nut screw hole 174 to an outer circumferential surface 172a of the protruding portion 172. The nut screw hole 174 is formed such that an attachment bolt (male screw) 176 of the roof rail 22 can be screwed thereto. When the attachment bolt 176 of the roof rail 22 is screwed into the nut screw hole 174 of the protruding portion 172, the roof rail 22 is attached to the adjustment mechanism 65 and fixed to the roof panel 14.

Also, the protruding shape portion 82 of the fitting protrusion member 72 is screwed to the female screw 78 of the fitting recess member 71.

Thus, the protruding portion 172, the fitting recess member 71, and the fitting protrusion member 72 are integrated.

According to the roof rail attachment member 170, the protruding portion 172 is provided integrally with the fitting recess member 71 of the adjustment mechanism 65, and the fitting recess member 71 is screwed to the fitting protrusion member 72 of the adjustment mechanism 65. Therefore, the protruding portion 172, the fitting recess member 71, and the fitting protrusion member 72 can be integrated. Thus, the load input from the roof rail 22 can be appropriately transmitted to the adjustment mechanism 65 via the protruding portion 172.

Also, by forming the protruding portion 172 with the nut portion and providing the protruding portion 172 integrally with the fitting recess member 71, the nut screw hole 174 can be formed in the axial direction up to the fitting recess member 71. Therefore, a depth dimension H2 of the nut screw hole 174 can be sufficiently secured in a state where a height dimension H1 of the protruding portion 172 is curbed smaller than the depth dimension H2 of the nut screw hole 174. Further, an outer diameter dimension (outer circumference dimension) D1 of the protruding portion 172 can be increased as compared with the case where the protruding portion 172 is formed of a male screw portion. Thus, the load input from the roof rail 22 can be more appropriately transmitted to the adjustment mechanism 65 via the protruding portion 172.

For example, when the roof panel 14 is attached to the roof rail attachment member 170, the roof panel 14 is lowered in the direction of an arrow B, and the first through-hole 41 of the roof panel 14 and the second through-hole 47 of the reinforcing member 16 are fitted into the protruding portion 172.

The roof rail attachment member 170 is disposed to be inclined with respect to a descending direction of the roof panel 14. For this reason, in order to fit the first through-hole 41 and the second through-hole 47 in the protruding portion 172, it is necessary to ensure that each through-hole 41 and 47 be larger than an inclination dimension L1 of the protruding portion 172. Also, in consideration of a sealing performance between the protruding portion 172 and the through-holes 41 and 47, the through-holes 41 and 47 are preferably formed along the outer circumferential surface 172a of the protruding portion 172.

Therefore, the protruding portion 172 is configured of a nut portion and the height dimension H1 of the protruding portion 172 is kept small. Therefore, the inclination dimension L1 of the protruding portion 172 can be kept small. Thus, the first through-hole 41 and the second through-hole 47 can be formed, for example, in a shape closer to a circular shape along the outer circumferential surface 172a of the protruding portion 172. Therefore, it is possible to satisfactorily ensure seal applicability between the protruding portion 172 and the through-holes 41 and 47.

Furthermore, by forming the first through-hole 41 and the second through-hole 47 along the outer circumferential surface 172a of the protruding portion 172, it becomes possible to position each through-hole 41 and 47 with respect to the protruding portion 172 with high precision, and thus setability of the roof panel 14 can be ensured satisfactorily.

Also, the discharge hole 175 is penetrated from the nut screw hole 174 to the outer circumferential surface 172a of the protruding portion 172. Thus, for example, when the vehicle body Ve to which the roof panel 14 is fixed is immersed in a rust preventive coating liquid and is electrodeposited, excess coating liquid can be discharged from the nut screw hole 174 outside of the protruding portion 172 through the discharge hole 175 such that excess coating liquid does not remain in the nut screw hole 174.

The first seal material 62 that closes the gap 87 between the first and second through-holes 41 and 47 and the protruding portions 67, 142, 152, 162, and 172 of the first to eighth embodiments is easy to be processed and inexpensive, for example, because it is a thermosetting sealing member such as a sealing material or a caulking material.

Also, there is no concern of deterioration of the sealing performance of the first seal material 62 due to deterioration of the rubber over time, as compared with a rubber seal member in a conventional roof rail fixing structure (a structure in which rubber is crushed and sealed at a constant rate).

For this reason, the sealing performance that closes the gap 87 between the first and second through-holes 41 and 47 and the protruding portion 67, 142, 152, 162, and 172 can be satisfactorily maintained for many years.

Furthermore, since a load transmission path of the roof rail fixing structure (article-fixing device 20) can be configured only with metal components, there is no concern of embrittlement due to aging, and the load transmission to the vehicle body Ve can be kept good for many years.

In addition, it is possible to appropriately replace the constituent elements in the above-described embodiments with known constituent elements without departing from the scope of the present invention, and the above-described modified examples may be appropriately combined together.

For example, in the first to eighth embodiments, although an example in which, on the lower surface side of the roof panel 14, the raised portion 16c is joined to the lower surface 14c of the roof panel 14 and the head seat surface 66 of the article-fixing device 20 is joined to the lower surface 16d of the raised portion 16c has been described, the present invention is not limited thereto. As another example, for example, the head seat surface 66 of the article-fixing device 20 can be directly joined to the lower surface 14c of the roof panel 14.

Also, components of the article-fixing device are components attached to the vehicle body such as a roof rail and a spoiler.

What is claimed is:

1. An article-fixing device, comprising:
   an adjustment mechanism which is interposed between a first plate and a second plate and is joined to a lower surface side of the first plate; and
   a protruding portion which is provided integrally with the adjustment mechanism and fixes an article to an upper surface of the first plate,
   wherein the protruding portion is configured of a screw portion which is fixed by being screwed to the article,
   the adjustment mechanism includes a first member which is provided integrally with the protruding portion and a second member which is screwable to the first member, and
   the article-fixing device further includes a fastening bolt which passes through the second member, is screwed to the first member, and thereby fastens the second plate to the second member.

2. An article-fixing device, comprising:
   an adjustment mechanism which is interposed between a first plate and a second plate and is joined to a lower surface side of the first plate; and
   a protruding portion which is provided on the adjustment mechanism and fixes an article to an upper surface of the first plate,
   wherein the protruding portion is configured of a screw portion which is fixed by being screwed into the article and includes a head portion in which an insertion screw hole is formed,
   the adjustment mechanism includes a cylindrical first member into which the head portion of the protruding portion is pressed and a second member which can be screwed to the first member, and the article-fixing device further includes a fastening bolt which fastens the second plate to the second member by passing through the second member and being screwed into the insertion screw hole.

3. An article-fixing device, comprising:

an adjustment mechanism which is interposed between a first plate and a second plate and is joined to a lower surface side of the first plate; and a protruding portion which is provided integrally with the adjustment mechanism and fixes an article to an upper surface of the first plate, wherein the protruding portion is configured of a nut portion which fixes the article by being screwed to a male screw of the article, the adjustment mechanism includes a first member which is provided integrally with the protruding portion and a second member which can be screwed to the first member, and the article-fixing device further includes a fastening bolt which fastens the second plate to the second member.

4. The article-fixing device according to claim 3, wherein the protruding portion includes a discharge hole penetrating from the screw hole in which the male screw of the article is screwed to an outer circumferential surface of the protruding portion.

\* \* \* \* \*